United States Patent
Adams

(10) Patent No.: US 6,890,443 B2
(45) Date of Patent: May 10, 2005

(54) SPIN FILTER SYSTEM

(75) Inventor: Billy J. Adams, Pooler, GA (US)

(73) Assignee: Amphion International Limited, Garden City, GA (US)

(*) Notice: Subject to any disclaimer, the term of this patent is extended or adjusted under 35 U.S.C. 154(b) by 0 days.

(21) Appl. No.: 10/824,319

(22) Filed: Apr. 12, 2004

(65) Prior Publication Data

US 2004/0251214 A1 Dec. 16, 2004

Related U.S. Application Data

(60) Provisional application No. 60/466,260, filed on Apr. 29, 2003.

(51) Int. Cl.[7] .............................................. B01D 33/073
(52) U.S. Cl. ..................... 210/695; 210/702; 210/241; 210/748; 210/297; 210/784; 210/315; 210/791; 210/360.2; 210/803; 210/402; 210/107; 210/407; 210/112; 210/497.01
(58) Field of Search ............................... 210/695, 702, 210/748, 780, 784, 791, 803, 107, 112, 241, 297, 315, 360.1, 360.2, 402, 407, 497.01

(56) References Cited

U.S. PATENT DOCUMENTS

6,336,561 B1 * 1/2002 Kossik et al. ............... 210/396

* cited by examiner

Primary Examiner—Robert A. Hopkins
(74) Attorney, Agent, or Firm—Darby & Darby

(57) ABSTRACT

A spin filter apparatus for cleaning an influent stream is provided and includes a housing having at least one inlet port for receiving the influent stream, at least one waste port for discharging waste and at least one output port for discharging a processed clean effluent stream. The apparatus also includes a discharge conduit coupled to the at least one outlet port for discharging the processed clean effluent stream; and a spin filter assembly disposed within the housing and including a filter screen set formed of at least two screen filters that are rotatable about the discharge conduit and freely movable in a vertical direction along the discharge conduit. The screen set is coupled to a magnetic shaft that permits the screen set to be a free floating structure that is movable in the vertical direction due to a magnetic field generated between the magnetic shaft and a first magnetic element disposed in the housing that permits the screen set to be controllably and selectively moved in the vertical direction as the screen set rotates, thereby providing two independent cleaning actions.

54 Claims, 13 Drawing Sheets

FIG. 10 SPIN FILTER SCREEN LYTIC SIGNAL

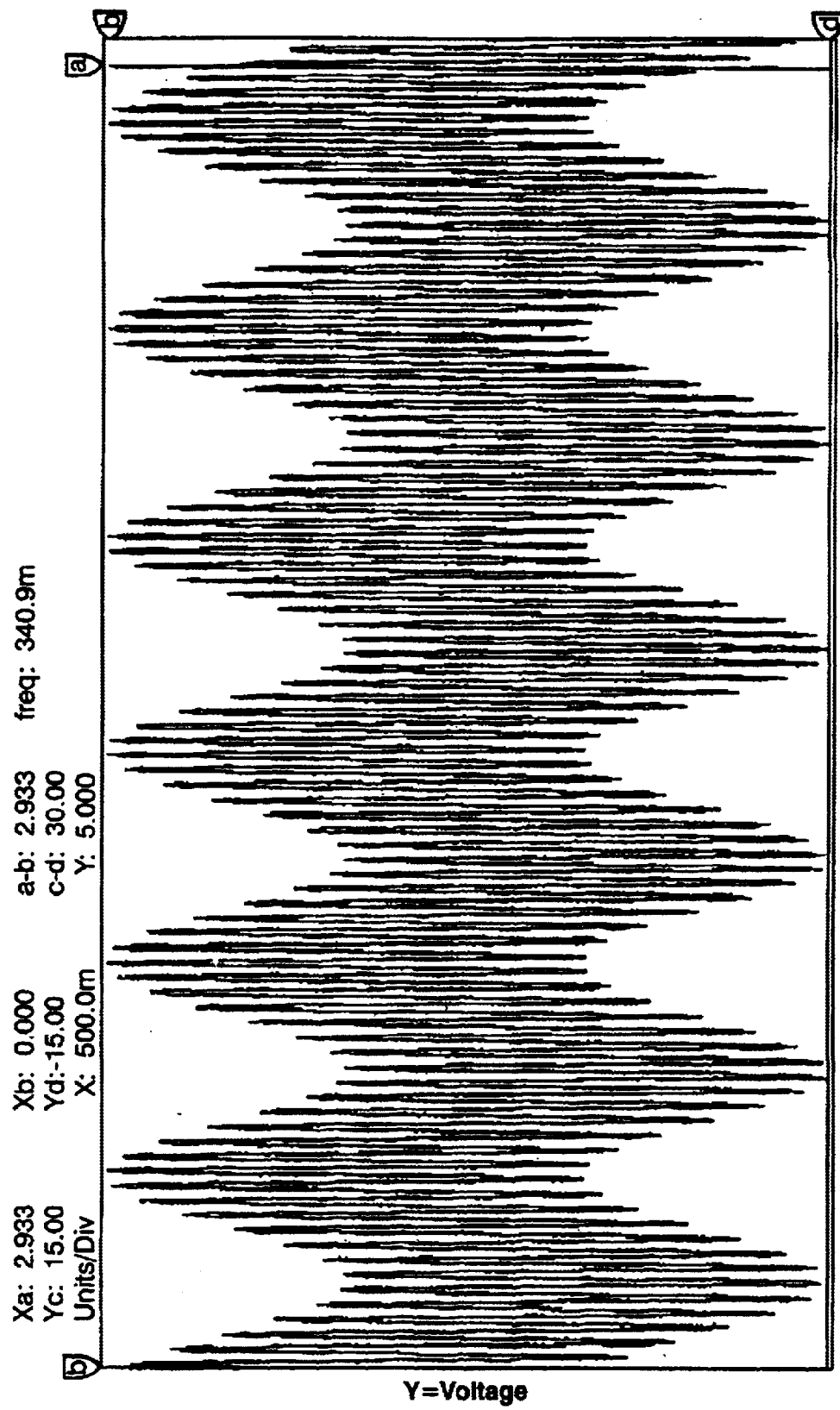

under scrutinyUS 6,890,443 B2

SPIN FILTER SYSTEM

CROSS-REFERENCE TO RELATED APPLICATION

This application claims the benefit of U.S. patent application Ser. No. 60/466,260, filed Apr. 29, 2003, which is hereby incorporated by reference in its entirety.

TECHNICAL FIELD

The present invention relates generally to devices for treating and filtering an influent stream, and more particularly to a system for reducing the total particle count within a liquid influent using spin filtering techniques.

BACKGROUND

Over the years, there has been an increased desire to clean up the world's, and especially our country's waterways due to increased scrutiny from the public and governmental agencies and the general realization that water is a precious commodity who cleanliness can not be taken for granted.

There are number of different causes of water pollution. For example, chemicals, such as pesticides and other industrial chemicals, can seep into the water supply due to illegal dumping or ineffective cleaning processes. Another source of pollution is micro living organisms that are present in the water. For example, since the 19$^{th}$ Century discovery of the cause of cholera epidemics and in London and their prevention through treatment of sewage and other effluent to remove and/or kill organisms within the effluent, many advances have been made in the treatment of organically polluted effluent.

There are a number of different filter apparatus that include some type of filter mechanism for cleaning an influent stream by passing the stream through a screen set. For example, one type of filter apparatus is a spin filter apparatus which gets its name from having a screen set that has a cylindrical shape that allows the rotation of the screen so that centripetal force can be used to give the would be fowling particle an acceleration away from the screen and against the liquid flow pressure. A problem with wire mesh filter screens, as with all filtration mediums, is fouling by way of particulate entanglement. This fowling greatly reduces the efficiency of the spin filter apparatus and can lead to ineffective filtering of the influent stream.

It is therefore desirable to provide a spin filter apparatus that overcomes the above particle entanglement problem by including a number of different features that cooperate together to eliminate this problem while still allowing maximum liquid flow.

SUMMARY

A spin filter apparatus for cleaning an influent stream is provided and includes a housing having at least one inlet port for receiving the influent stream, at least one waste port for discharging waste and at least one output port for discharging a processed clean effluent stream. The apparatus also includes a discharge conduit coupled to the at least one outlet port for discharging the processed clean effluent stream; and a spin filter assembly disposed within the housing and including a filter screen set formed of at least two screen filters that are rotatable about the discharge conduit and freely movable in a vertical direction along the discharge conduit. The screen set is coupled to a magnetic shaft that permits the screen set to be a free floating structure that is movable in the vertical direction due to a magnetic field generated between the magnetic shaft and a first magnetic element disposed in the housing that permits the screen set to be controllably and selectively moved in the vertical direction as the screen set rotates. This results in the influent stream being cleaned by passing through the screen set and creating a first flow made up at least partially of the waste and a second flow made up of the processed clean effluent stream. The first flow travels in one direction towards the at least one waste port and the second flow travels in another direction and is received within the discharge conduit where it is then withdrawn from the housing through the at least one outlet port.

Additional mechanical and electrical cleaning mechanism are incorporated into the device to ensure that the device efficiently and effectively reduces the total particle count of the influent while the problem of particle entanglement is overcome due to the screen set being moved in a number of different directions and the presence of other mechanisms that serve to prevent or discourage particle entanglement.

Further aspects and features of the exemplary apparatus disclosed herein can be appreciated from the appended Figures and accompanying written description.

BRIEF DESCRIPTION OF THE DRAWINGS

The invention will be more fully understood by reference to the following drawings which are for illustrative purposes only:

FIG. 12 is a diagramatic illustration of one exemplary signal for the magnetic modulating current input.

DETAILED DESCRIPTION OF THE PREFERRED EMBODIMENTS

Figure 1:
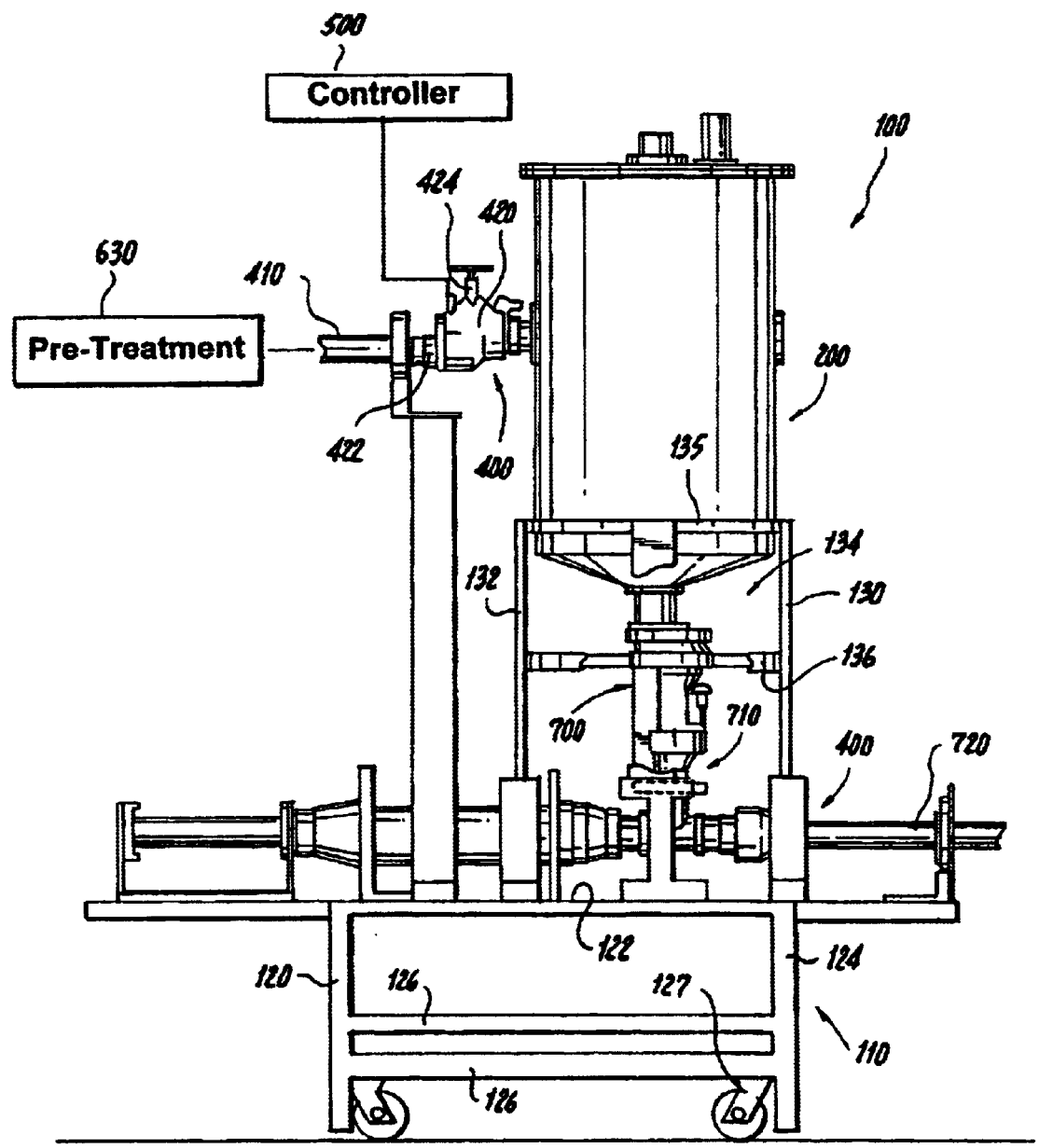
FIG. 1 is a side elevation view of a spin filter system according to one exemplary embodiment.

Referring first to FIG. 1, a spin filter system for reducing the total particle count within and otherwise filtering a liquid influent is provided and generally indicated at 100. The spin filter system 100 is formed of a number of different components and generally these components can be grouped and identified as a housing 110, a spin LYTIC filter assembly 200 that is operatively mounted to the housing 110, an inlet and outlet conduit network 400 for introducing a liquid influent into the spin LYTIC filter assembly 200 and for discharging cleaned effluent therefrom and a controller 500 for controlling and coordinating the operation of the various working components. It will be understood that a clean liquid or cleaned liquid is any liquid with less particles than influent to the present cleaning process and particle waste is a combination of the influent liquid and its laden particles of sizes equal to and greater than the blocking ability of the screens used in the spin filter system 100.

The housing 110 supports the spin LYTIC filter assembly 200 and can be of the type that is stationary (fixed) or alternatively, the housing 110 can be of mobile type since the present spin filter system 100 can be designed on a large scale, such as a system that is large enough for the treatment of an entire city's sewer outflow or an outflow from a large industrial plant, or the system 100 can be just large enough to produce cleaned effluent for a small business or for a small group of people, as in the case of portable water for a military platoon size water supply. For purpose of illustration only, the exemplary housing 110 of FIG. 1 is of a smaller scale and is actually of the mobile type to permit easy positioning of the system 100 in a desired locale. It will be appreciated that the depiction in FIG. 1 and the description of the system 100 in terms of being particularly suited for smaller scale application is not limiting in any manner since the general components and working arrangements and operation between the small scale construction and the large scale construction are essentially the same.

One exemplary housing 110 includes a base section 120 and a vertical section 130 that is fixedly connected to the spin LYTIC filter assembly 200. The base section 120 has a floor 122 that supports a number of different components of the filter system 100, such as the spin LYTIC filter assembly 200 and the inlet and outlet conduit network 400. More specifically, the base section 120 has a number of vertical supports 124 that are spaced apart and there are a number of horizontal support members 126 that extend between and are integrally attached to the vertical supports 124. The vertical supports 124 are disposed at the ends and corners of the base section 120 and attach at upper ends thereof to the floor 122 that represents the topmost horizontal support member 126. The base section 120 is constructed so that it can easily withstand the load of the components of the spin filter system 100 that are supported thereby.

Optionally and as illustrated, the housing 110 includes coasters 127 that are securely mounted to a bottommost horizontal support member 126 and permit mobility of the system 100.

The vertical section 130 is securely coupled to the base section 120 and extends upwardly from the floor 122. The vertical section 130 includes a predetermined number of vertical support members (posts) 132 that are arranged according to a predetermined pattern such that a space 134 is formed therebetween for receiving at least a portion of the spin LYTIC filter assembly 200. Preferably, the vertical section 130 includes one or more horizontal support members 136 that extends between and is integrally coupled to the vertical support members 132 to provide additional strengthening of the vertical section 130. The exemplary vertical section 130 includes an uppermost support structure 135 that is disposed at distal ends of the vertical support members 132. This support structure 135 is in the form of a series of horizontal support beams that extend between adjacent vertical support members 132 while maintaining the openness of space 134 that receives at least a portion of the spin LYTIC filter assembly 200. As will be described in greater detail hereinafter, the vertical section 130 includes a number of brackets or the other type of fastener components to permit the spin LYTIC filter assembly 200 to be securely fastened to the vertical section 130 in an upright position. Other brackets and other mounting equipment can be provided in different areas of the housing 110 to permit coupling between various components of the system 100.

Referring now to FIGS. 2–6, the spin LYTIC filter assembly 200 is illustrated in greater detail. The spin LYTIC filter assembly 200 is formed of a number of different parts that are operatively arranged to provide a system that receives an influent stream and filters and reduces the particle count of the influent before discharging it as a cleaned effluent. The assembly 200 includes a spin filter housing 210 that has a first end 212 and an opposing second end 214 as well as inner surface 216 and an outer surface 218. While one exemplary housing 210 is described as being a tank, one will understand that the housing 200 is merely a container or receptacle for receiving the influent and for containing the other operative parts of the assembly 200. Merely for purposes of convenience and for illustrative purposes, the housing 210 will be described hereinafter as being a tank.

The tank 210 is preferably formed of a material that has anti-corrosive properties and more specifically, the tank 210 is preferably formed of a metal, such as stainless steel. Both the first and second ends 214, 216 of the tank 210 are open to permit discharge of material and liquids from the tank 210. The exemplary tank 210 is of a tapered construction and is configured so that it has a first section 220 that is generally cylindrical in nature and a second section 222 that is frusto-conical 224 in nature. The cylindrical first section 210 extends from the first end 212 to a point 213 where it transitions into the frusto-conical second section 224 which extends to a point proximate to the second end 214. The second end 214 actually includes a tank sludge outlet 226 that extends from the frusto-conical second section 224 to the second end 214. The outlet 226 can be in the form of a tubular member that extends from the second section 224 and permits a conduit (not shown) to be coupled thereto for removal of sludge (solid material as well as liquid) from the tank 210.

The tank 210 also includes one or more influent inlet ports 228 that are formed in the tank 210 to permit introduction of one or more influent streams into an interior thereof. In one embodiment, the influent inlet ports 228 are formed in a side wall that forms the cylindrical first section 220 and in one exemplary embodiment, there are two influent inlet ports 228 that are formed about 180 degrees apart from one another with one of the influent inlet ports 228 being an active port that receives an influent stream as is described below. The first end 212 is preferably completely open and therefore this opening occupies a significantly greater area than the opening formed at the second end 214 as part of the outlet 226. A peripheral flange or rim 221 is formed at the first end 212 and includes a number of openings 217 formed therein for receiving fasteners that serve to fixedly yet removably attach a tank lid 230 to the first end 212 of the tank 210. The tank 210 also includes a number of brackets or other mounting structures that permit the tank 210 to be securely attached to the housing 110 so that the tank 210 is held in a fixed, upright manner. In the illustrated embodiment, there are three sets of brackets that are arranged so that the pair of brackets in each pair are arranged generally opposite on another. As shown and according to one exemplary embodiment, a lower portion of the first section 220 and the second section 224 and outlet 226 are disposed within the space 134 of the vertical section 130 and one or more sets of brackets are used to securely attach the tank 210 to the vertical section 130.

The spin LYTIC filter assembly 200 also includes an internal spin filter system 240 that is disposed within the interior of the tank 210. As best shown in FIGS. 2–6, the internal spin filter system 240 is formed of a number of parts that are operatively connected to one another. The spin filter system 240 includes a clean effluent shaft assembly 250 that is coupled to the tank lid 230, a LYTIC assembly 260, a magnetic float assembly 270 and a spin screen and float assembly 280 disposed therebetween and structural support elements 300 to provide strength to the assembly 200.

The clean effluent shaft assembly 250 is complementary to the tank lid 230 and serves to provide a flow path for the cleaned effluent to be discharged from the interior of the tank 210 after the influent undergoes the below described filtering and cleaning processes. The tank lid 230 has an inner surface 232 that faces the interior of the tank 210 and is typically conductive in nature due to the tank lid 230 being formed of a conductive material, such as a metal. The tank lid 230 has an opening formed in a central portion thereof for discharging the effluent therethrough. The tank lid 230 has a center discharge conduit 234 that is securely mounted to the tank lid 230 on the inner surface 232 thereof. One exemplary center discharge conduit 234 is a tubular member that has a flange 235 formed at or near one end thereof. The flange 235 has openings formed therein that align with openings formed in the tank lid 230 to permit fasteners to extend therethrough for securely mounting the conduit 234 to the inner surface 232 of the tank lid 230 such that the conduit 234 is axially aligned with the center opening of the tank lid 230. The effluent shaft assembly 250 includes a shaft 252 that securely mounts to the center discharge conduit 234. The mounting between the shaft 252 and the center discharge conduit 234 can be achieved using any number of conventional techniques including forming threads on an outer surface of a portion of the shaft 252 and then threadingly mating these threads with inner threads formed within the center discharge conduit 234 until a secure connection results.

Insulating members can be added around the shaft 252 to protect the shaft 252 and also components that are disposed around or near the shaft 252. For example, a first heat shrink or insulating spacer 254 can be disposed over the outer surface of the shaft 252 and a second heat shrink or insulating spacer 256 can be disposed over the first heat shrink 254 to provide improved insulation. In one exemplary embodiment, the first heat shrink 254 is formed of PVC and the second heat shrink 256 is formed of TEFLON. Because the shaft 252 is in the form of a tubular member, the heat shrinks 254, 256 are tubular in shape to permit them to be disposed in surrounding relationship with the shaft 252 and preferably, the heat shrinks 254, 256 are rigid plastic (insulating) tubular members. In yet another aspect, if the length of the shaft 252 is insufficient for some applications, as explained hereinafter, an extender shaft (not shown) can be mated with the shaft 252 for increasing the overall length of the shaft 252 so as to draw water therethrough at lower depths. The extender shaft is preferably formed of a plastic material, such as PVC.

The LYTIC assembly 260 cooperates with the shaft 252 and includes a top slip ring 262 that is generally in the form of an annular ring-shaped electrode that is disposed around the shaft 252. When the various components are assembled, the top slip ring 262 is disposed adjacent one end of the insulating spacer 256 (heat shrink). The top slip ring 262 is formed of a material, such as a metal, that permits the part to function as an electrode. According to one exemplary embodiment, the top slip ring electrode 262 is a silvered graphite slip ring. The assembly 260 also includes a bottom conductive slip ring 264 that is spaced from the top slip ring electrode 262 and is also generally in the form of an annular ring-shaped electrode that is disposed around the shaft 252. As with the top slip ring electrode 262, the bottom conductive slip ring 264 is formed of a conductive material, such as a metal. According to one exemplary embodiment, the bottom conductive slip ring 264 is a silvered graphite slip ring. One or more insulating elements can be disposed proximate the bottom slip ring 264. More specifically, a bottom insulating standoff or spacer 267, which is similar to the top insulating spacer 256, is disposed between the bottom conductive slip ring 264 and the spin screen and float assembly 280.

A biasing element 266 is disposed between the top slip ring electrode 262 and the bottom conductive slip ring 264 and is in electrical contact with both of these elements and permits movement of at least the bottom conductive slip ring 264 relative to the top slip ring electrode 262 and linearly along the shaft 252 when a force is applied thereagainst. More specifically, the biasing element 266 is continuously under tension and therefore exerts a force against both of the top and bottom conductive slip rings 262, 264; however, because the top slip ring 262 seats against the top insulating spacer 256, it is prevented from moving up and down the shaft 252 during operation. In one exemplary embodiment, the biasing element 266 is a heavy compression spring that is disposed around the shaft 252. One end of the compression spring 266 is disposed against the top slip ring electrode 262 and the other end of the compression spring 266 is disposed against the bottom conductive slip ring 264. As previously mentioned, the position of the top slip ring electrode 262 is generally fixed since the compression spring 266 continuously exerts a force thereagainst and the insulating spacer 256 restricts movement thereof and when a force is applied against the bottom conductive slip ring 264 in a direction toward the compression spring 266, the compression spring 266 compresses (stores additional energy), thereby permitting movement of the bottom conductive slip ring 264 along the shaft 252. As soon as the force is removed, the compression spring 266 releases some of its stored energy and the bottom conductive slip ring 264 travels back in the opposite direction along the shaft 252, thereby causing the bottom conductive slip ring 264 to move away from the top slip ring electrode 262.

Because the top slip ring 262, the compression spring 266 and the bottom slip ring 264 are all in intimate contact along conductive surfaces thereof, a conductive flow path is created therebetween such that an electrical signal can travel from the top slip ring 262 to the bottom slip ring 264 even when the compression spring 266 and the bottom slip ring 264 are moving up or down along the shaft 252. It will be appreciated that the top insulating spacer 256 and the bottom insulating standoff or spacer 267 serve to electrically insulate the conductive top slip ring 262, the compression spring 266 and the bottom slip ring 264 from other surrounding conductive members, such as the tank lid 230. In this manner, an electric signal delivered to the top slip ring 262 is not transferred to surrounding conductive structures, such as the tank lid 230, but rather is transferred through the compression spring 266 to the bottom slip ring 264.

The tank lid 230 has at least one seal through hole that is formed therein to permit routing of electronic wires and the like from a location outside of the tank 210 to a location inside the tank 210. More specifically, the LYTIC assembly 260 has a number of electrical wires to permit electric signals to be delivered to the LYTIC assembly 260 from an external source. For purpose of illustration, a wire (conductor) 261 for delivering LYTIC electric signal power is disposed through the tank lid 230 through the seal through hole to a slip ring setting onto the compression spring 266 that is supported onto the set of slip rings 262, 264. It will therefore be appreciated that the conductive nature of the slip rings 262, 264 and the compression spring 266 permits electric signals to be carried along and by these elements from an external source that generates the electric signals. The further processing of the electric signals is described in greater detail hereinafter.

As best shown in FIGS. 3–5 and 9, the spin screen and float assembly 280 includes a first screen disk 282, a second screen disk 284 and a screen set 286 that is disposed between and securely attached to the first and second screen disks 282, 284. The screen set 286 is formed of an inner screen 288 that is connected to ground (acts as an earth ground reference), an insulating spacer screen 290 that is disposed between the inner screen 288 and an outer screen 292 that can be electrically charged at prescribed times. The inner screen 288 has a first particle blockage characteristic (e.g., mesh size) and the outer screen 292 has a second particle blockage characteristic (e.g., mesh size) which is less than that of the inner screen 288. In other words, the mesh size of the outer screen 292 is finer than the mesh size of the inner screen 288 and therefore the outer screen 292 is a filter grade screen that blocks particles that could otherwise pass through the inner screen 288. Thus, as the influent passes through the screen set 286 (inner and outer screens 288, 292), the influent is filtered through two different sized screens which act as a double filtering mechanism to reduce the total particle count of the influent.

In one exemplary embodiment, the inner screen 288 is a 316 L stainless steel Dutch Weave screen that blocks larger particles from the clean liquid flow output that is discharged from the tank 210. The size of the perforations of the inner screen 288 can vary depending upon the precise application and the level of desired particle reduction (filtration); however, in one embodiment, the inner screen 288 is a heavy 316 stainless steel quarter inch perforation screen that acts as a base electrode due to it being connected to ground. The mesh size of the outer fine mesh screen 292 can also be varied depending upon the precise application. In one exemplary embodiment and for less than 30 micrometer sized particle blockage, a wire cloth of mesh 200×600 with a wire diameter of 0.0024/0.0018 inches is used. This type of wire cloth has an absolute particle retention of 28 to 32 micrometers according to the Screen Technology Group, Inc. When very clean liquid processing is required, the present system can be fitted with an even finer mesh wire cloth to serve as the outer screen 292. An absolute retention of five micrometers can be had with a 500×3500 mesh wire cloth with a wire diameter of 0.0010/0.0006 inches.

The screen set 286 is thus a cylindrically shaped body in its assembled state and it is assembled by layering the inner screen 288, the spacer screen 290 and the outer screen 292 relative to each other and then securely attaching this layered structure at its opposite ends to the first screen disk 282 and the second screen disk 284, respectively, using conventional techniques, such as casting the disks 282, 284 onto the opposite ends of the layered structure. As previously mentioned, the insulating spacer screen 290 is layered on top of the inner screen 288 to electrically isolate the inner screen 288 from the outer screen 292. In one exemplary embodiment, the spacer screen 290 is formed of an insulating plastic material, e.g., a TEFLON spacer. The spacer screen 290 preferably has the same dimensions of the inner screen 288 so that it covers the surface of the entire inner screen 288. This mesh spacer screen 290 forms a 30 millimeter separation between the inner screen 288 and the outer screen 292 according to one exemplary embodiment. The outer screen 292, which acts as a charged electrode, preferably has dimensions that are different than the dimensions of the inner screen 288 and the spacer screen 290. More specifically, the outer screen 292 preferably has dimensions that are less than the other two screens 290, 292. For example, the ends of the outer screen 292 can be indented (e.g., about ½ inch) relative to the ends of the other two screens 290, 292. By indenting the conductive (charged) outer screen 292 relative to the others, it is stood off from the other screen edges and more importantly, is electrically isolated from the disks 282, 284. In other words, it is not desirable for the edges of the outer screen 292 to be very close to the disks 282, 284 since the outer screen 292 is charged and it is not desirable for the disks 282, 284 to be charged as a result of being in contact or a close proximate relationship with the charged outer screen 292.

Figure 10:
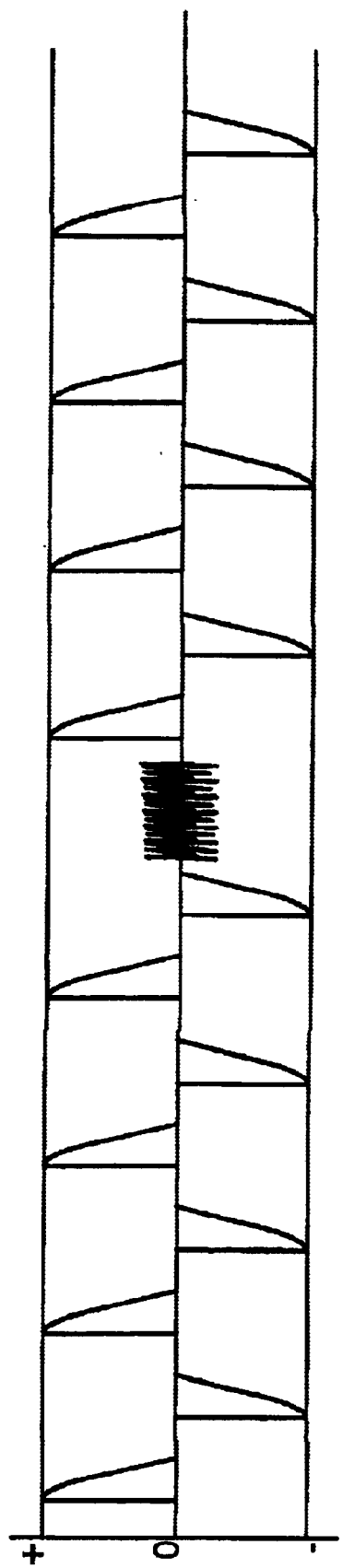
FIG. 10 is a diagramatic illustration of one exemplary LYTIC drive signal.

Instead of using the inner screen 288, the innermost member can be a cylindrically shaped base that is foraminous in nature and serves as a structural support for the other two screens which are laid thereon. It will be appreciated that the inner screen 288 (or the alternative foraminous cylinder) serves two purposes, namely, it serves as an earth ground reference and it provides a structural backbone for the spacer screen 290 and the fine mesh outer screen 292. The outer screen 292 is electrically connected to the LYTIC assembly 260 so that an electric signal (electric charge) can be delivered thereto. More specifically, a connecting wire (electric signal carrier) 259 is securely connected to the outer screen 292 and the bottom slip ring 264 so that an electric signal can be delivered from the bottom slip ring 264 to the outer screen 292. This connecting wire 259 is therefore formed of a conductive material so that it can carry an electric charge (high frequency, high voltage signal in reference to the earth ground) and it will be appreciated that because the connecting wire 259 is attached between two parts that are rotated together at the same speed, the connecting wire 259 will rotate therewith and therefore will not become entangled or bound with nonmoving parts. FIG. 10 is a diagramatic illustration of one exemplary LYTIC drive signal.

The first screen disk 282 is a circular member that has a central opening formed therein to receive a section of the shaft 252 and a number of other openings formed therein to permit passage of electric wires or the like and to receive fasteners for securely attaching the first screen disk 282 to another member. The first screen disk 282 is fixedly attached to the bottom insulating spacer 267 so that the two can rotate together about the shaft 252 while also being permitted to move in up and down directions along the shaft 252. The second screen disk 284 is a similar structure in that it is a circular member with a central opening formed therein and also includes a number of other openings that are formed therein for attaching the second screen disk 284 to one or more other members. A number of support disks 279 are provided as part of the screen set 286 to provide structural support for the screen set 286 along its longitudinal length. Each of the support disks 279 has a central opening formed therein which are each aligned with one another to provide a flow path of the fluid within the inner boundaries of the screen set 286. In addition, a number of vertical supports 297 can be provided and spaced around the screen set 286. More specifically, the vertical supports 297 are connected to the screen disks 282, 284 and the support disks 279 to provide additional support. These vertical supports 297 are disposed inside of the inner screen 288. Support members 279, 297 may be more necessary in embodiments where the height of the screen set 286 is significant since it serves as a backbone for the mesh screens.

Figure 5:
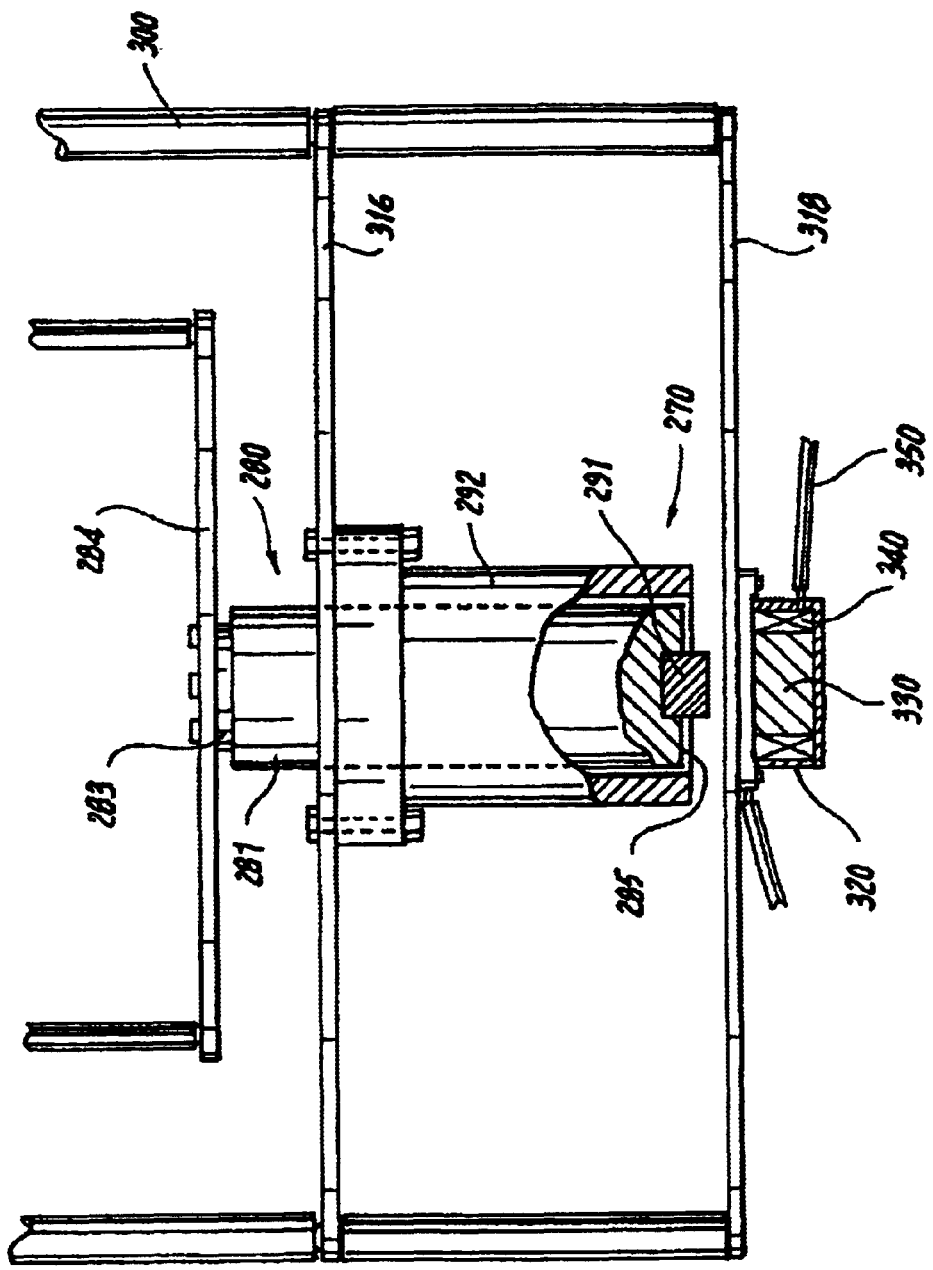
FIG. 5 is a cross-sectional view illustrating a permanent magnet set-up of the spin LYTIC filter assembly in a first position.
Figure 6:
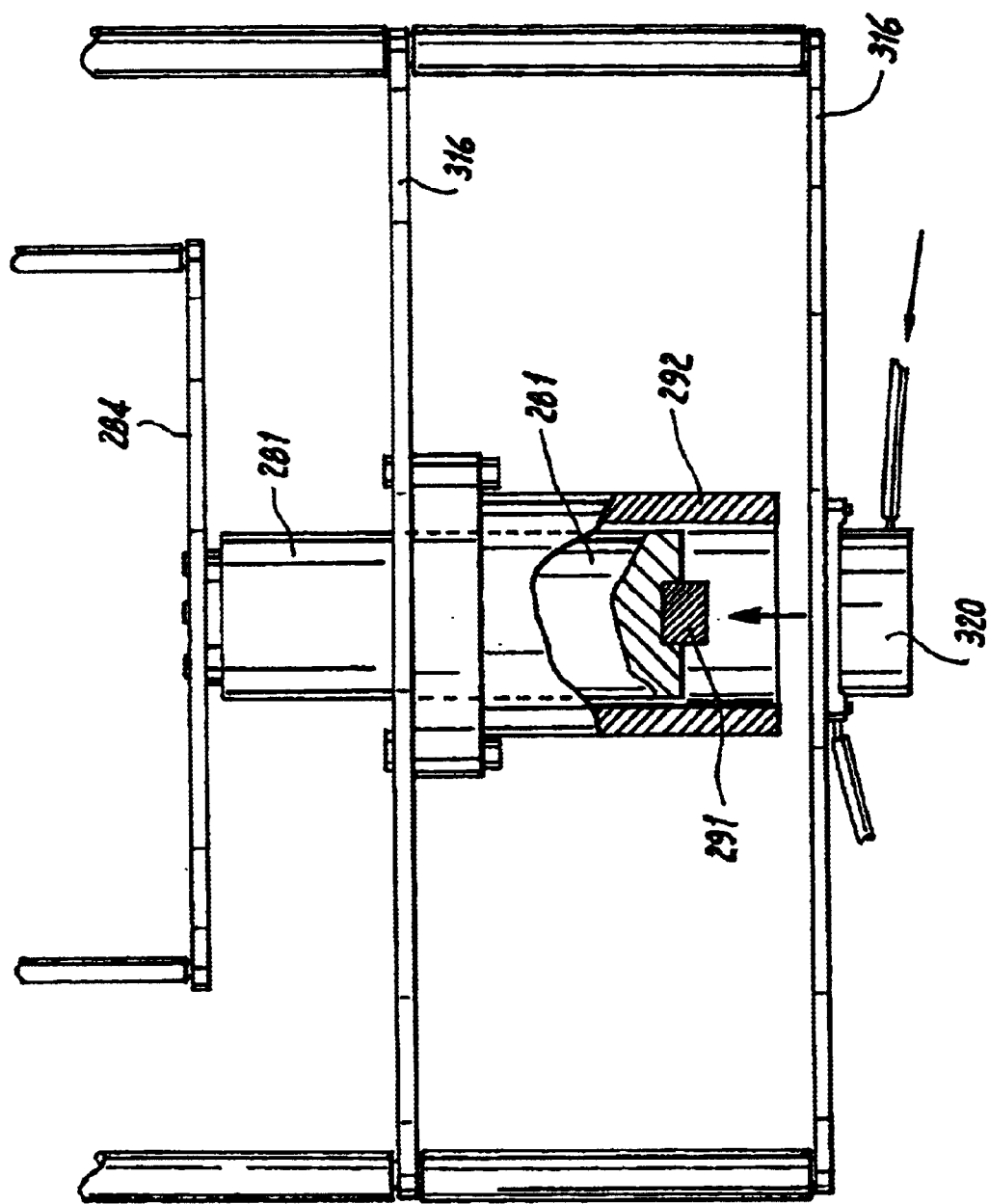
FIG. 6 is a cross-sectional view of the permanent magnet set-up of FIG. 5 in a second position.

The spin screen and float assembly 280 also includes a magnetic float shaft 281 that is best shown in FIG. 5. The magnetic float shaft 281 is an elongated shaft formed of a magnetic material and has a first end 283 and an opposing second end 285. A bore is formed through the magnetic float shaft 281 from the first end 283 to the second end 285. In the illustrated embodiment, the magnetic shaft 281 has a cylindrical shape and the first end 283 thereof includes a flange or mounting section that is designed to locate and center the magnetic float shaft 281 relative to the second screen disk 284. The flange is formed at the first end 283 and is of a reduced diameter relative to the body of the shaft 281 such that a shoulder is formed between the flange and the shaft body.

The flange is received within or through the central opening of the second screen disk 284 and this serves to center the shaft 281 relative to the second screen disk 284. The first end 283 includes a number of mounting openings formed in the shaft body for securely attaching the shaft 281 to the second screen disk 284. For example, a number of fasteners can be received through the mounting openings and complementary openings formed in the second screen disk 284 for securely attaching the two together.

At the second end 285, a first permanent magnet 291 is disposed thereat and more specifically, the first permanent magnet 291 is disposed at least partially within the bore of the shaft 281. However, a section of the first permanent magnet 291 preferably extends below the second end 285 of the shaft 281. In one exemplary embodiment, the first permanent magnet 291 is a strong neodymium magnet of circular shape. The magnetic shaft 281 and the first permanent magnet 291 provide a magnetic float assembly that permits the screen set 286 to float and move up and down relative to the shaft 252 in a controlled manner as described in greater detail below.

Referring to FIGS. 3–6, in the assembled state, the screen set 286 and more specifically, the first and second screen disks 282, 284 thereof, are supported by first and second bearings 290, 292, respectively. More specifically, the first bearing 290 is securely attached to an underside of the first screen disk 282 such that the first bearing 290 extends away from the underside and towards the second screen disk 284. The first bearing 290 is a cylindrical member that has a bore extending therethrough from one end to the other end. The first bearing 290 is attached to the first screen disk 282 so that the bore is axially aligned with the central opening formed in the first screen disk 282 and therefore, the shaft 252 is received into the bore in such a manner that the first bearing 290 can both intimately rotate around the shaft 252 as well as move up and down (linearly) along a length of the shaft 252. The first bearing 290 can be attached using conventional techniques, such as using fasteners that are passed through openings formed in the first screen disk 282 and then using bolts or the like to complete the attachment. One exemplary first bearing 290 is a long ceramic through mount linear bearing. The inner surface of the bore can be coated with a TEFLON glass layer to facilitate rotational movement of the shaft 252 within the bore in opposing rotational directions and up and down movement.

Because the first screen disk 282 is attached to the bottom insulating spacer 267 at one face and the first bearing 290 at the opposite face and the fixed shaft 252 is received within the bore so that it is in intimate contact with the inner bore surface of the first bearing 290, these joined parts will rotate together about the shaft 252 when a rotational force is applied thereto and also will move up and down the shaft 252 when this type of directed force is applied to thereto.

More specifically, the second bearing 292 is securely attached to an underside of the second screen disk 284 such that the second bearing 292 extends away from the underside and the screen set 286. The second bearing 292 is similar to or identical to the first bearing 290 and therefore, it is a cylindrical member that has a bore extending therethrough from one end to the other end. The second bearing 292 is attached to the second screen disk 284 so that the bore is axially aligned with the central opening formed in the second screen disk 284 and therefore, the magnetic shaft 281 is received into the bore in such a manner that the magnetic shaft 281 can both intimately rotate within the bore due to rotation of the screen set 286 as well as move in up and down directions along a length of the bore. One exemplary second bearing 292 is a long ceramic through mount linear bearing. The inner surface of the bore can be coated with a TEFLON glass layer to facilitate rotational movement of the magnetic shaft 281 within the bore in opposing rotational directions in addition to up and down movements. The dimensions of the magnetic shaft 281 are such that an intimate fit results between the magnetic shaft 281 and the inner surface of the bore of the second bearing 292.

The second bearing 292 is different than the first bearing 290 in that the second bearing 292 is mounted in a stationary manner as opposed to the first bearing 290 which can rotate about the shaft 252 and travel up and down a length of the shaft 252. The moving part between the shaft 281 and the second bearing 292 is thus the shaft 281.

Figure 3:
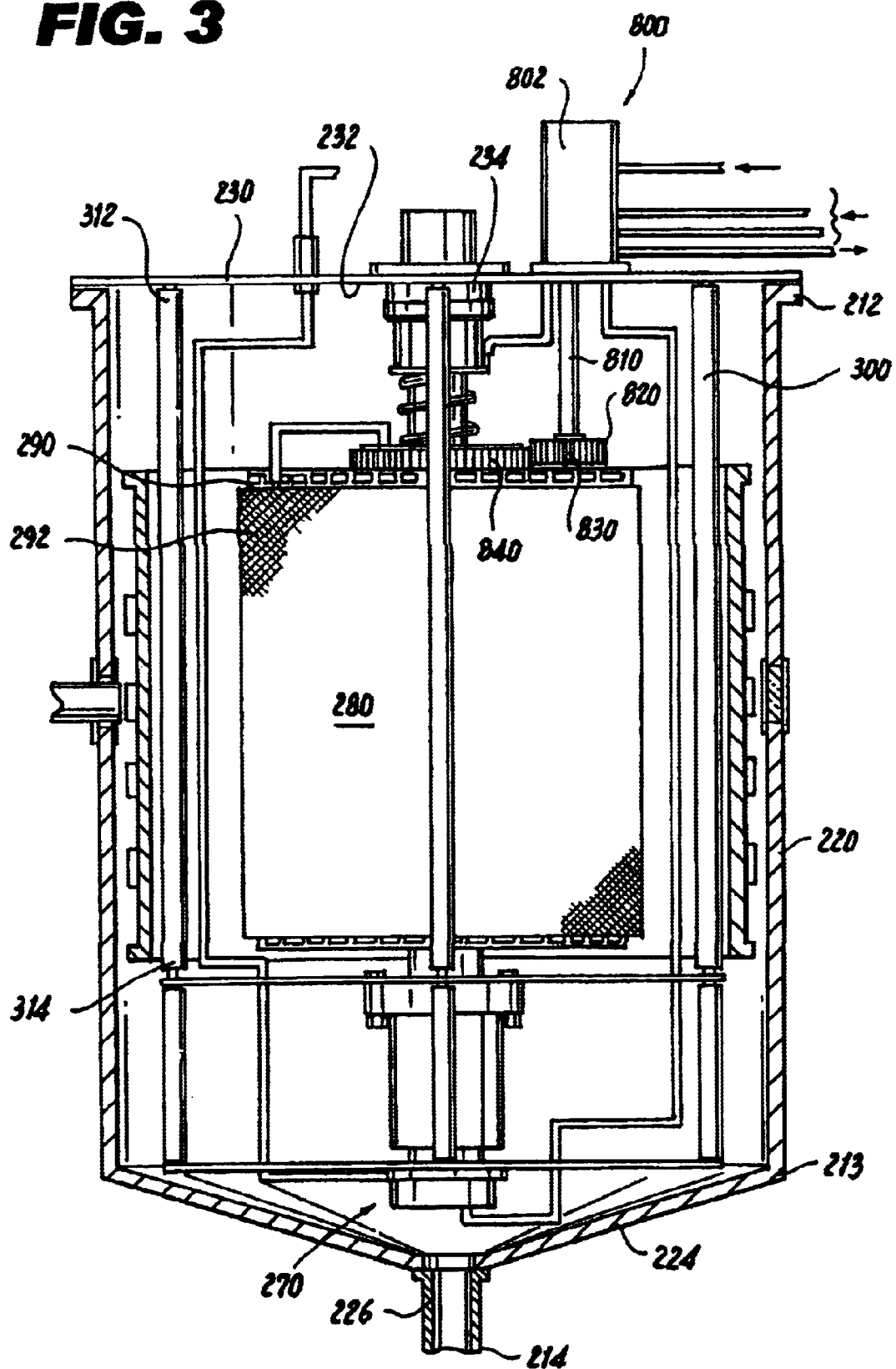
FIG. 3 is a cross-sectional view of a portion of the spin filter system illustrating the housing and the spin LYTIC filter assembly.

A support structure 300 is best illustrated in FIG. 3 and is constructed to support, locate and positionally maintain the LYTIC filter assembly 200. In one exemplary embodiment, the support structure 300 includes a plurality of vertical support members or coupling posts 310 that have first ends 312 and opposing second ends 314. The first ends 312 of the coupling posts 310 are proximate the tank lid 230 while the second ends 314 lie below the screen set 286. The support structure 300 includes several horizontal support members 316, 318 that are integrally attached to the coupling posts 310 at peripheral edges thereof so as to define an upright standing structure. The first and second horizontal support members 316, 318 are arranged in a perpendicular manner relative to the coupling posts 310. The first horizontal support member 316 can also be referred to as a bottom bearing mount since the second bearing 292 is securely mounted thereto. The bottom bearing mount 316 thus includes an opening formed therein to permit the magnetic shaft 281 to be received therethrough and further, the bottom bearing mount 316 includes a number of mounting openings formed therein for securely attaching the second bearing 292 thereto. The second bearing 292 is mounted to the bottom bearing mount 316 such that the bore formed therethrough is axially aligned with the opening formed in the bottom bearing mount 316 to permit the magnetic shaft 281 to extend into the bore of the second bearing 292.

It will therefore be appreciated that the second bearing 292 is fixed relative to the bottom bearing 292. The bottom bearing 292 can be attached using conventional techniques, such as the use of fasteners that extend through openings formed in a flange or mounting section of the second bearing 292 and through complementary openings formed in the bottom bearing mount 316. The first and second bearings 290, 292 thus serve to support and hold the screen set 286, including the screen disks 282, 284, in place while the screen set 286 is rotated.

The second horizontal member 318 is a bottom magnetic mount and is disposed parallel to and below the first horizontal member 316. When the second bearing 292 is securely attached to the bottom bearing mount 316, a bottommost section of the second bearing 292 is spaced apart from the bottom magnetic mount 318. The sections of the coupling posts 310 that are located between the bottom bearing mount 316 and the bottom magnetic mount 318 serve as stand off posts to separate these two mounts 316, 318.

It will be appreciated that when the magnetic shaft 281 coupled to the screen set 286 is disposed within the bore of the second bearing 292, the second end 285 of the shaft 281 is disposed first into the bore of the second bearing 292 so that the shaft 281 can be positioned in the bore with the first permanent magnet 291 protruding at least partially from the bore of the second bearing 292 in facing relationship to the bottom magnetic mount 318.

The bottom magnetic mount 318 has a plurality of openings formed therein for securely mounting a magnet housing 320 thereto. The magnet housing 320 is constructed to hold and contain a second permanent magnet 330 in a fixed manner. The attachment between these two parts is done using conventional techniques, such as using fasteners that extend through complementary mounting openings formed in a flange of the magnet housing 320 and the bottom magnetic mount 318. The second permanent magnet 330 is similar to the first permanent magnet 291 and the two magnets 291, 330 are orientated in equal polarity types so that the two magnets 291, 330 repel one another. A magnetic field is thus formed between the two magnets 291, 330. Since the first permanent magnet 291 is coupled to the magnetic shaft 281, the magnetic repulsion between the two magnets 291, 330 causes the magnetic shaft 281 to magnetically float the entire screen set 260 on the elastic magnetic field medium.

It will also be appreciated that the bottom magnetic mount 318 also has a number of cut outs formed therein to permit the passage of the liquid influent from a location underneath the bottom magnetic mount 318 towards the screen set 286 such that the influent can be cleaned.

Preferably, an electric modulating coil 340 is disposed within the magnet housing 320 such that the electric coil 340 surrounds the second permanent magnet 330 that is contained within the magnet housing 320. A magnetic signal carrier 350, such as a conductive wire or the like, connects the electric coil 340 to an external location where a device, such as controller 500 (FIG. 1), is provided for generating and delivering magnetic signals to the electric coil 340 to influence the magnetic field. More specifically, an applied current (AC current) is delivered through the carrier 350 to the electric coil 340 and this results in a total increase or decrease in the magnetic filed (between the first and second permanent magnets 291, 330) used to float the screen set 286. This applied field change causes the rotating screen set 286 to move vertically since the magnetic shaft 281 is directly attached to the screen set 286 and freely moves within the second bearing 292. In other words, as the electric charge increases, the strength of the magnetic field increases causing the further repulsion between the magnets 291, 330, which results in the entire screen set 286 traveling towards the tank lid 230. Conversely, when the electric charge is decreases, the strength of the magnetic field decreases and this results in the magnet 291 moving back towards the magnet 330. As will be described hereinafter, the rotation and vertical movement of the screen set 286 forms a controlled complex motion. The magnetic signal carrier 350 is preferably routed to the electric coil 340 along one of the coupling posts 310 and then enters the magnet housing 320 for connection to the electric modulating coil 340.

As previously mentioned, a problem with wire mesh filter screens, as with all filtration mediums, is fouling by way of particulate entanglement. In spin filter designs, such as the present one, there are several processes that are made to work together eliminating this problem, while at the same time allowing maximum liquid flow. The spin filter process gets its name from the screen filters cylindrical shape that allows the rotation of the screen so that centripetal force can be used to give the would be fowling particle an acceleration away from the screen and against the liquid flow pressure. The rotation speed can be increased to a point where the clean processed liquid from inside the screen cylinder volume can be forced back out through the screen for a high velocity backwash.

Figure 4:
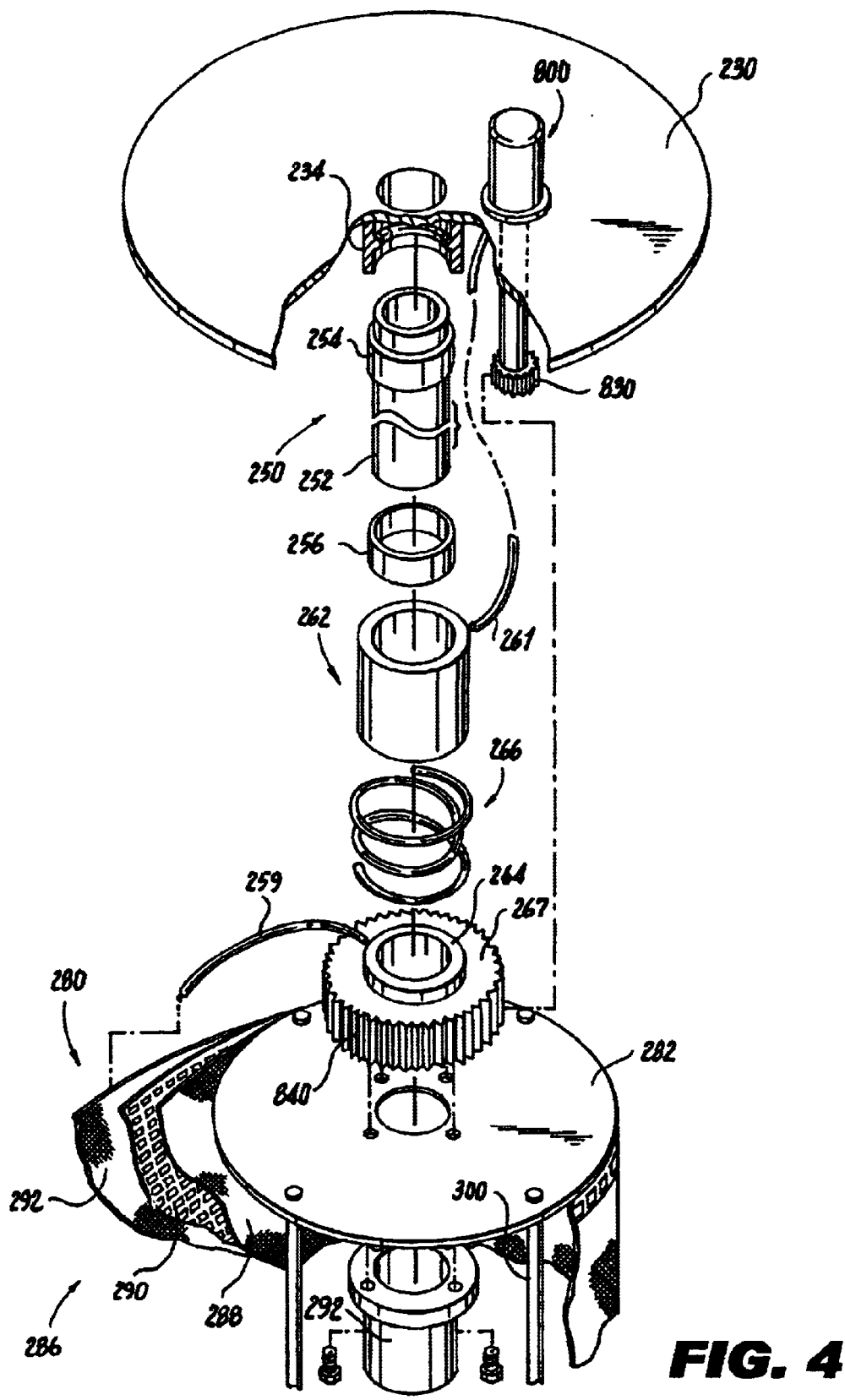
FIG. 4 is an exploded perspective view of a portion of the spin LYTIC filter assembly.

As best shown in FIGS. 3–4, the rotation of the screen set 260 is achieved by incorporating an electric motor 800 into the system 100 or any other type of device that causes the screen set 260 to rotate in a controlled manner. Accordingly, any number of different electric motors can be used so long as the motor is a rotating motor that can cause the controlled rotation of the screen set 260 in at least one and preferably two directions of rotation. In one exemplary embodiment, the electric motor 800 is a rotating motor (e.g., DC drive motor) and includes a rotatable drive shaft 810. The main housing 802 of the motor 800 is disposed external to the interior of the tank 210 and more specifically, the main housing 802 is disposed on and preferably mounted to the outer surface of the tank lid 230. The tank lid 230 is constructed so that it includes an opening for receiving the motor drive shaft 810 in a sealed manner, thereby enabling an external sealed rotary drive. The electric motor 800 includes a gear system that is arranged so that it translates the rotation of the drive shaft to rotation of the screen set 286, including the first and second screen disks 282, 284 and the first bearing 290.

In one exemplary embodiment, a belt or gear system 820 is provided to accomplish this and includes a first drive gear 830 that is associated with the drive shaft 810 and a second gear 840 that is associated with the screen set 286. More specifically, the first drive gear 830 is integrally coupled to a distal end of the first drive gear 830 and is in the form of a shaped body that has teeth or the like extending therearound. In the illustrated embodiment, the shaped body of the first drive gear 830 is circular in shape. The drive shaft 810 is rotatable in two directions; however, the drive shaft 810 does not move linearly; and therefore, the first drive gear 830 is a stationary gear that rotates in two directions just as the drive shaft 810 does since it is directly coupled thereto. The second drive gear 840 is coupled to the first screen disk 282 and is constructed to mesh with the first drive gear 830 so that rotation of the drive shaft 810 is translated into rotation of the second drive gear 840. In one exemplary embodiment, the second drive gear 840 is formed as part of the bottom insulating spacer 267. The second drive gear 840 is thus formed as complementary teeth or the like formed along an outer annular surface of the bottom insulating spacer 267. Rotation of the drive shaft 810 is imparted to rotation of the drive belt and gear mechanism resulting in rotation of the bottom insulating spacer 267 and because the bottom insulating spacer 267 is associated with and more particularly fixedly attached to the first screen disk 282, the rotation of the bottom insulating spacer 267 is translated into rotation of the screen set 286.

Figure 11:
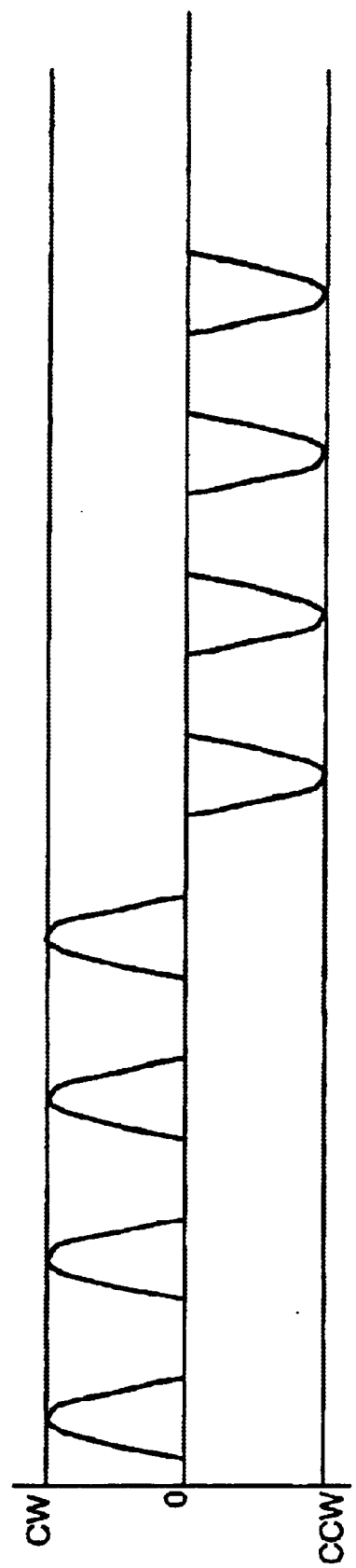
FIG. 11 is a diagramatic illustration of one exemplary motor drive current.

Because the rotation of the screen set 286 is preferably caused by actuation of an electric rotating motor, the rotation is servo controlled so that different speeds and directions can be utilized. Through computer program control, the rotation is preferably modulated to increase speed clockwise at a sine rate for one half time period and the decelerate for an equal time then repeated for several cycles. This process is repeated but in the opposite direction with a polarity reversal of the same complex waveform. FIG. 11 is a diagramatic illustration of one exemplary motor drive current (signal).

Figure 2:
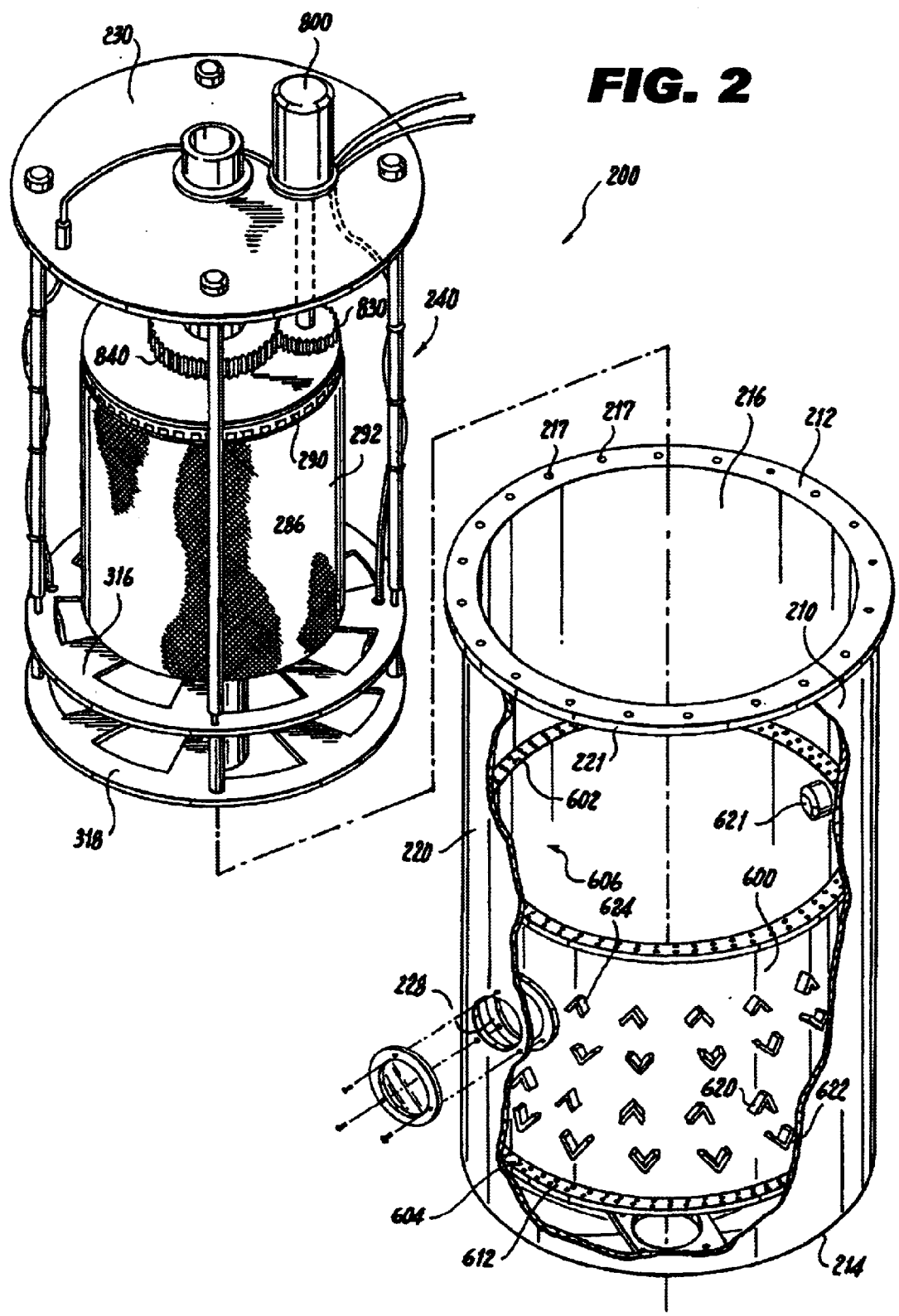
FIG. 2 is an exploded perspective view of a housing and spin LYTIC filter assembly of the system of FIG. 1.

The system 100 also preferably includes an influent system means that forces particles of smaller size to collect into larger conglomerates within the system 100 and more specifically, one exemplary device for accomplishing the aforementioned is an averaging tube 600. As best shown in FIG. 2, the averaging tube 600 is a cylindrical tube-like body that has a first end 602, an opposing second end 604, an inner surface 606 and an outer surface 608. The first end 602 has a first flange member 610 formed thereat and which extends around a periphery of the first end 602. The first flange member 610 thus has a diameter greater than a diameter of the cylindrical body of the averaging tube 600 and thus it extends beyond the outer surface 608. The first flange member 610 can have a number of mounting openings formed therein to receive fasteners or the like for mounting the first flange member 610 to the inside of the tank 210. The second end 604 has a second flange member 612 formed thereat and which extends around a periphery of the second end 604. The second flange member 612 thus has a diameter greater than a diameter of the cylindrical body of the averaging tube 600 and thus it extends beyond the outer surface 608. The diameters of the first and second flange members 610, 612 can be different but preferably, they are about the same to facilitate mounting the averaging tube 600 to the tank 210. As with the first flange member 610, the second flange member 612 can have a number of mounting openings formed therein to receive fasteners or the like for mounting the second flange member 610 to the inside of the tank 210. For example, the flange member 610, 612 can be fastened to internal mounting structures (e.g., brackets) formed on the inner face of the tank 210 or they can be fastened to other support/mounting hardware that is disposed within the inside of the tank 210.

The outer surface 608 of the averaging tube 600 includes a series of containment features 620 that are formed as part of the outer surface 608 and arranged thereover according to a predetermined pattern. In the illustrated embodiment, the containment features 620 are a series of V shaped features that are fixedly attached to the outer surface 608 (e.g., by welding, etc.) and are arranged in a series of rows where each row either has either a V up configuration 622 or a V down configuration 624 (i.e., an inverted V configuration). Each of the V configurations 622 is slanted open end down 5 degrees and each of the inverted V configurations 624 is slanted up 5 degrees to their open end. The V shaped containment configurations 620 capture particles with less density than the liquid in the V down configuration 624 and the V up configuration 622 capture particles that are heavier than the liquid. It will therefore be appreciated that each capture process forces particles to collect resulting in the particle separation or filtration of the influent.

The averaging tube 600 is securely attached within the tank 210 such that the one or more inlet ports 228 are adjacent to and face the outer surface 608. Further, when the screen set 286 is disposed in the tank 210 and when it moves through its range of vertical movement during operation, the screen set 286 is disposed within the averaging tube 600 between the first and second ends 602, 604 thereof. This orientation of the averaging tube 600 causes the influent stream that enters the tank 210 to contact the outer surface 208 and more specifically, the influent stream contacts the containment configurations 622, 624, which serve to disperse the influent into a number of different flow paths and because the averaging tube 620 is open at both of its ends 602, 604, the influent can flow therein and into contact with the spin filter screen set 286 for cleaning (filtering) of the influent by separating particles from the liquid influent. The averaging tube 620 thus prevents localized pressure on the screen set 286 at the location where the influent stream enters the tank 210 (i.e., at the location(s) of one the one or more inlet ports 228). In one exemplary embodiment, a gap of between about 2–8 inches (e.g., 4 inches) is formed between the averaging tube 620 and the tank 210.

The compacting action of the containment features 622, 624 can be enhanced by applying an ultrasonic and/or subsonic vibration to the averaging tube 600. For example, one or more vibration units 621 can be disposed on the inner surface 606 of the averaging tube 600 for selectively causing rotation of the averaging tube 600. The vibration units 621 can be in communication with a controller, such as controller 500, which generates control signals to cause the vibration units 621 to vibrate at prescribed times and for prescribed time periods. In one embodiment, there are two vibration units 621 mounted on the inner surface 606 near one end thereof and in an approximately opposing orientation (i.e., 180 degrees apart). It will be appreciated that the vibration units 621 can receive and send control signals to the controller either over a wire or the like or the vibration units 621 can communicate in a wireless manner with the controller. These vibration units 621 cause the liquid influent to be modulated subsonically or ultrasonically and this promotes compression of the liquid influent and also the particles therein assume a charge, both of which results in particles coming together into a greater mass which then falls by gravity toward the waste conduit where it is removed.

Referring to FIG. 1, the spin filter system 100 also includes the inlet and outlet conduit network 400 for introducing a liquid influent to the spin LYTIC filter assembly 200 and for discharging cleaned effluent therefrom. The network 400 includes an influent conduit 410 (inlet conduit) that carries the liquid influent that is to be cleaned by the spin filter system 100. In one embodiment, the conduit 410 is a two inch pipe that can be arranged in a network. Preferably, the inlet conduit 410 communicates with an inlet valve mechanism 420 that controls the rate at which the influent is introduced into the tank 210. In one exemplary embodiment, the inlet valve mechanism 420 includes an inlet 422 that mates with the inlet conduit 410 for receiving the influent to be treated and further, the inlet valve mechanism 420 includes a control valve 424 that is programmable and preferably in communication with the controller 500 so that the influent flow can be started and stopped at prescribed times. Moreover, the programmable control valve 424 permits the flow rate of the influent to be continuously monitored and adjusted, if necessary. Use of electronic valving (control valve 424) allows flow control at a lesser cost than other methods of flow connectivity.

The system 100 optionally includes an influent pre-treatment station, generally indicated at 630, where the influent stream is initially filtered and cleaned prior to introducing the influent stream into the inlet valve mechanism 420. The influent pre-treatment station 630 can be in the form of an influent pre-chamber that is fitted with a large mesh screen and very strong magnets. The influent pre-treatment station 630 functions to block very large pieces of waste and also captures ferrous materials from the influent stream prior to its introduction into the tank 210 where the influent stream undergoes a spin filtering process.

The system 100 also preferably includes a sediment (mud) pumping system 700 that is operatively connected to the tank sludge outlet 226 for removing the built up sediment (sludge) that accumulates at or near the tank sludge outlet 226. In other words and during operation of the system 100, sediment (sludge) typically builds up within the frusto-conical second section 224 of the tank 210 and the tapered nature of this section promotes the sediment to pass into the tank sludge outlet 226. The pumping system 700 includes a pump 710 and a sludge output conduit 720 that carries the pumped sludge away from the sludge outlet 226 to another location, such as a disposal site.

The system 100 can be monitored and the individual working components thereof can be controlled with a controller, programmable computer or some other type of device. For example, a master controller 500 can be provided for monitoring and controlling the operation of the working components of the system 100. The master controller 500 is a programmable unit that is in communication (preferably two way) with the working components so that control signals can be delivered to the working components and feed back signals (as from sensors) can be received by the controller 500. The controller 500 is therefore in communication with the various pumps, valves, electric motor, high voltage source, etc. that are employed in the operation of the system 100. While the controller 500 can communicate to the individual components through wires and the like, it will also be appreciated that the controller 500 can communicate in a wireless manner.

The controller 500 preferably has a user interface in which the user can enter any number of different parameters. For example, the user can enter a prescribed ratio of solid particle to liquid and during the cleaning process, the controller 500 continuously receives feedback from sensors and the like (e.g., a sludge sensor for detecting the presence and amount of sludge at the bottom of the tank 210) and then generates an appropriate control signal that causes one or more components of the system 100 to take some action in order to ensure that the prescribed ratio remains with an acceptable range. The software of the controller 500 supports all of the working components such that the entire system 100 operates as a single integrated system as opposed to a number of different components that need to be controlled individually. For example, a sensor based on pressure differential within the tank 230 can be used to send a control signal to the controller 500 for instructing that that sludge at the bottom of the tank 210 be removed. In other words, the sensor monitors the pressure at a first upper location in the tank 210 and a second location at a lower location in the tank 210 near the sludge outlet 226. The pressures at these two locations are continuously monitored and compared and once the difference between the two pressure readings is greater than a threshold value, the sensor will send a signal to the controller 500. Upon receipt of the signal, the controller 500 will turn the pump 710 on and the sludge is removed through the sludge outlet 226. As the pump 710 operates, the pressure difference will decrease until the difference drops below a minimum threshold value at which time, the controller 500 instructs the pump 710 to turn off. The process continues and the pump 710 is activated when the pressure difference becomes greater than the threshold value. It will be appreciated that any number of other types of sensors can be used in the tank 210 to detect the presence of sludge.

Referring to FIGS. 1–8A, the operation of the system 100 is now discussed in greater detail. The influent to be cleaned is delivered to the spin filter system 100 through the influent conduit 410 and passes through the inlet valve mechanism 420 before entering the tank 210 through at least one influent inlet port 228. Upon entering the spin filter tank 210, the influent flow is made to pass through a system of flow velocity changes that are modulated by ultra and subsonic vibrations (FIG. 8A) that cause finer and colloidal particles to collect into denser globules that will fall out of solution better and the electric charges of lipid materials are made neutral eliminating sticking charge. The thin cylinder shape of the averaging tube 600 and the flow modifiers (features 620) cause the input flow velocity to be averaged over the entire cross-section of the tank 210, thereby reducing bottom mixing and giving an average flow to all the screen surface.

As the influent is introduced into the tank 210, the spin LYTIC filter assembly 210 is actuated so that the screen set 286 is set into controlled rotation. As previously mentioned, the electric motor 800 can be provided for causing the controlled rotation of the screen set 286 in both different directions and at different speeds. As the screen set 286 rotates as indicated by the arrow in FIGS. 7 and 8, centripetal force is used to give any would be fowling particle an acceleration away from the screen and against the liquid flow pressure (the flow of the influent). The rotation speed can be increased to a point where the clean processed liquid from inside the screen cylinder volume can be forced back out through the screen for a high velocity backwash. As mentioned, the electric motor is in communication with a controller (e.g., controller 500) or a programmable computer such that the rotation of the screen set 286 is modulated to increase speed clockwise at a sine rate for one half time period and then decelerate for an equal time then repeated for several cycles. This process is repeated but in the opposite direction with a polarity reversal of the same complex waveform. Preferably, the electric motor is therefore run by an electric current that is digitally modified as to its total power input such that the acquired centripetal force to the liquid influent is programmable to have controlled results. (See FIG. 11 for an exemplary motor drive signal).

Figure 7:
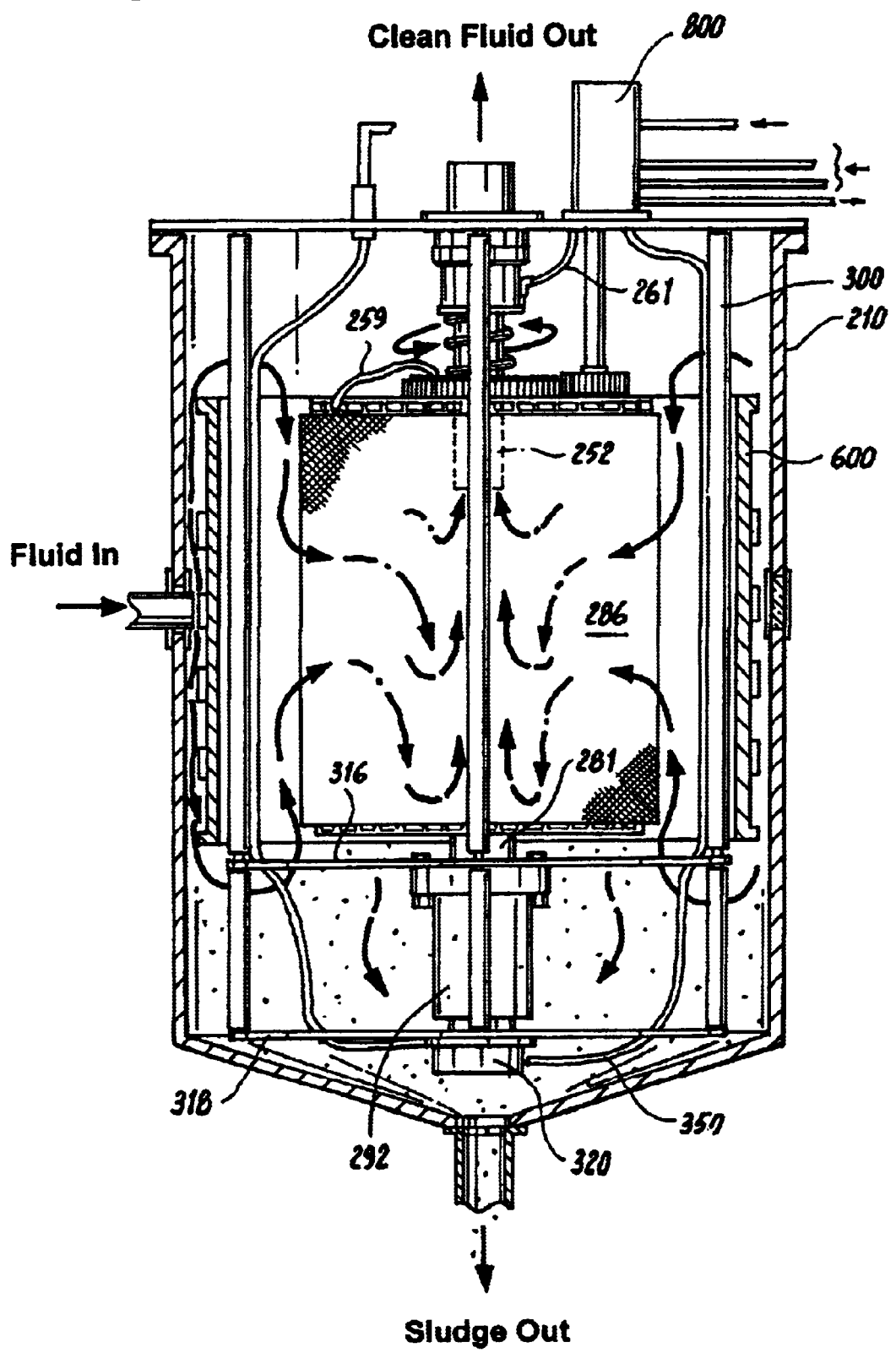
FIG. 7 is a cross-sectional view of the system showing the direction of fluid flow paths and the rotation of the spin LYTIC filter assembly, which is shown in a first extended position.
Figure 8:
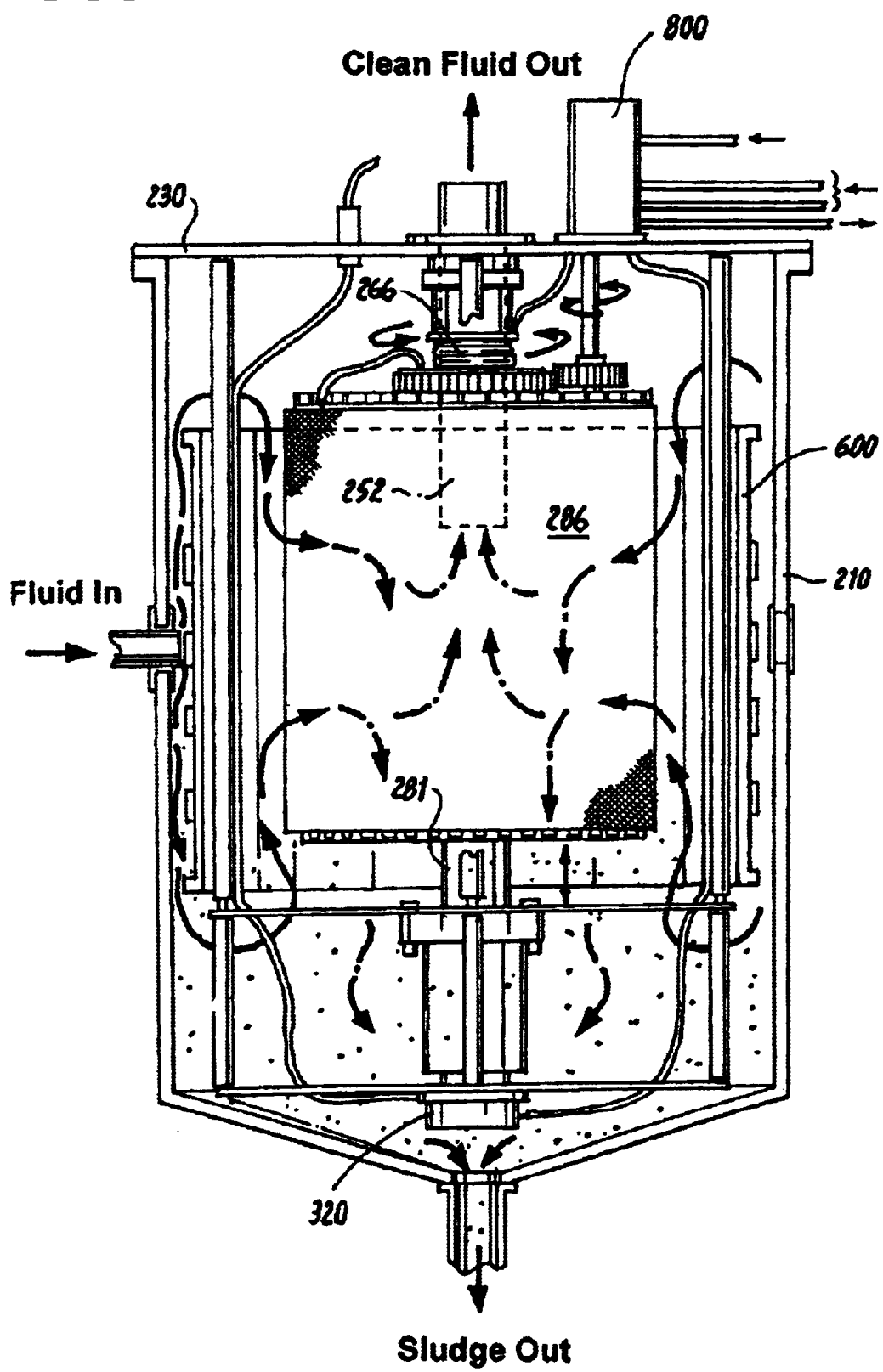
FIG. 8 is a cross-sectional view of the system of FIG. 7, with the spin LYTIC filter assembly shown in a second compressed position.

According to the present embodiments, not only does the screen set 286 rotate but it is also permitted a degree of vertical movement (up and down movement as shown in FIGS. 7 and 8) within the tank 210 since the screen set 286 is floated on a strong magnetic field and held into position with the first and second bearings 290, 292. More specifically, the upper section of the screen set 286 is fixedly connected to the first screen disk 282, which is itself attached to the bottom insulating spacer 267 and the first bearing 290, and all of these parts are disposed around the shaft 252 in a manner that allows them to travel vertically in up and down directions relative to the shaft 252. The screen set 286 is therefore not fixedly attached to any component that prevents vertical movement thereof. The compression spring 266 also influences the degree of vertical movement of the screen set 286 since the compression spring 266 is continuously under tension and therefore, in order for the compression spring 266 to be further compressed, the biasing force thereof must be overcome by the strength of the magnetic field which causes the screen set 286 to float and also causes vertical movement of the screen set 286.

Similarly, the bottom section of the screen set 286 is likewise not fixedly attached to any component that prevents vertical movement thereof. The magnetic shaft 281 is fixedly attached to the second screen disk 284 but is received within the second bearing 292 in a manner that permits vertical movement of the shaft 281 within the bore of the second bearing 292. The arrangement of the first and second permanent magnets 291, 330 and their relative polarities causes the screen set 286 to effectively float within the tank 210 and be freely movable in the vertical direction at the same time that the screen set 286 is being rotated. In other words, the screen set 286 can be moved perpendicular to its rotation. This is accomplished with the modulating coil 340 in close proximity to the magnetic float magnets (permanent magnets 291, 330). With the application of a specially formatted signal current through carrier 350 to the modulating coil 340, an ultrasonic and subsonic movement of the screen set 286 can be made to cause liquid acoustic cavitation at the surfaces of the mesh wires. In addition, this movement causes rapid positional changes that tend to displace entangled particles, allowing the liquid flow to push the particle away from the screen. FIG. 7 illustrates the screen set 286 in an extended position in which the biasing element 266 is relaxed and the screen set 286 is positioned closer to the second end 214 of the tank 210; while FIG. 8 illustrates the screen set 286 in a retracted position, in which the biasing element 266 is compressed and the screen set 286 is driven away from the second end 214 towards the first end 212 of the tank 210. It will be understood that as the magnetic field is changed in the manner previously described in great detail, the screen set 286 can move continuously between the two positions illustrated in FIGS. 7 and 8 and this continuous or periodic movement facilitates cleaning of the influent. FIG. 12 is a diagramatic illustration of one exemplary signal for the magnetic modulating current input (e.g., signal delivered to the modulating coil 340).

The system 100 includes a number of additional mechanisms for cleaning the influent. More specifically, the system 100 is configured so that an electric cleaning process similar to that disclosed in U.S. Pat. No. 5,466,425 (which is hereby incorporated by reference in its entirety) can be employed. This is why the assembly 260 is termed a LYTIC assembly and the LYTIC drive signal of FIG. 10 is identical or similar to that disclosed in the '425 patent. As previously mentioned, the outer fine mesh screen 292 is made of an electrically conductive material to permit this electric cleaning process to be used if the particle becomes bound to the surface or even wrapped around the wire mesh. The area between the inner and outer screens 288, 292 can be thought of as a stunning chamber that is used to break membranes of any celled and bacterial spores within the influent flow to expose any vital organisms there within which otherwise might be able to hide or be shadowed by the cellular structures. Because the inner screen 288 is an earth grounded reference and the outer screen 292 is electrically connected to a high voltage source through the slip rings 262, 264, compression spring 266 and the electric signal carrier 259; the two screens 288, 292 have opposite electrical potential and are spaced apart far enough by the insulating spacer screen 290 that microorganisms or small organic or inorganic particles do not wedge therebetween, clogging the stunning chamber, yet close enough to apply substantial electric potential from end to end across bacteria therebetween. If proper levels of electrical potential are applied in the stunning chamber, no celled organisms emerge therefrom with their cell walls intact, as disclosed in the '425 patent. Preferably, the electric signals are in the form of high voltage pulses. (See FIG. 10).

It will also be appreciated that the electric potential (high voltage electric field) that is created between the wires of the inner and outer screens 288, 292, effectively burns any debris or particles present in the influent that find their way between the two screens 288, 292. Further, any material (particles) that may become attached to the wires is cut away by the application of the electric potential. Thus, the material will be destroyed when it is subjected to such electric potential and thereby removed from the influent as part of the cleaning process. The electric potential between the two screens 288, 292 also serves to repel solid material that is present between the outer screen 292 and the averaging tube 600 since a like positive charge will be imparted to the material by the outer screen 292 as the material drifts towards the outer screen 292. The imparting of a like charge to the material serves to repel the material away from the outer screen 292 since it is well known that like charged elements are repelled not attracted.

Figure 8A:
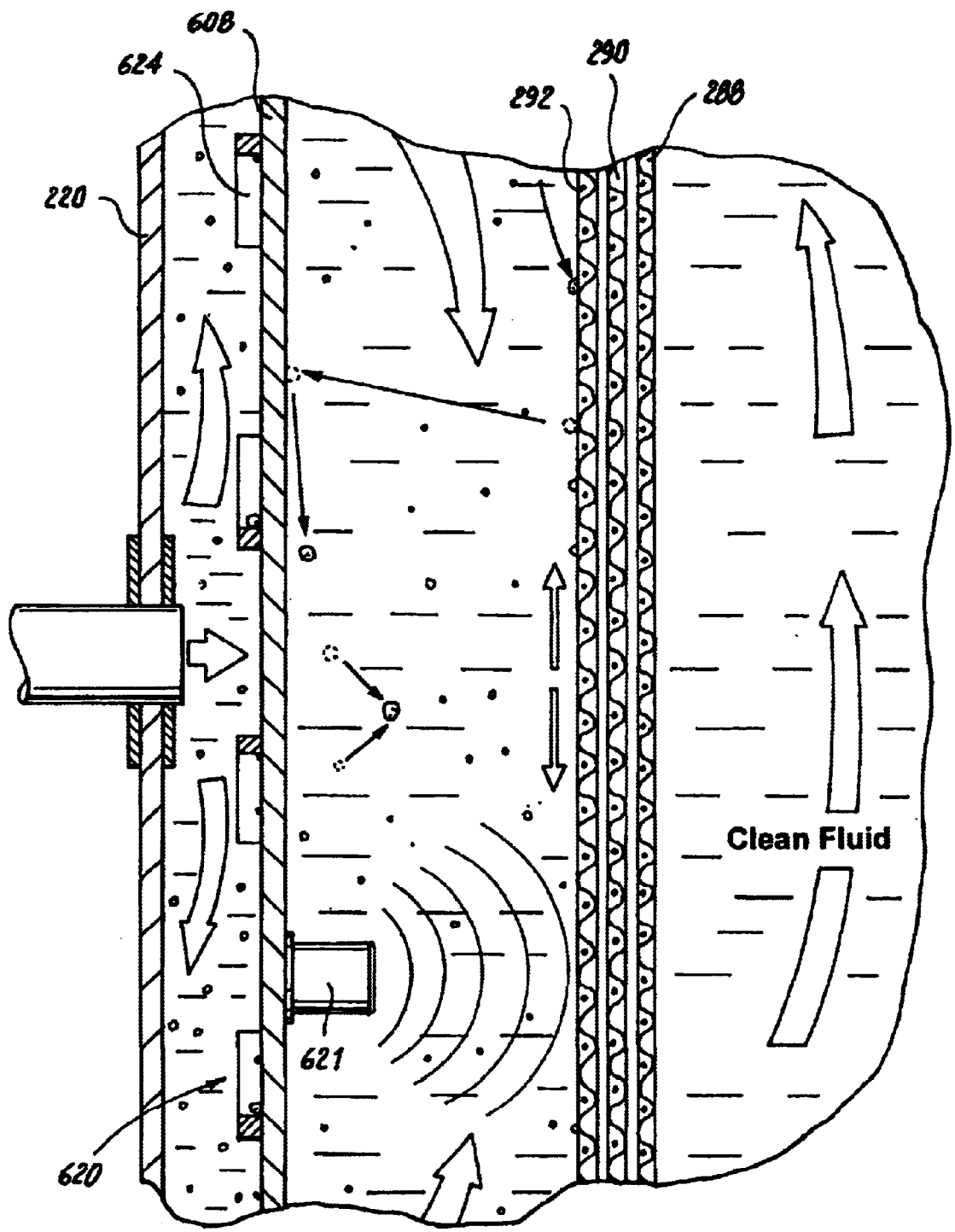
FIG. 8A is an enlarged sectional view of a portion of FIG. 8 showing the flow of fluids and waste within the assembly of FIG. 8.
Figure 9:
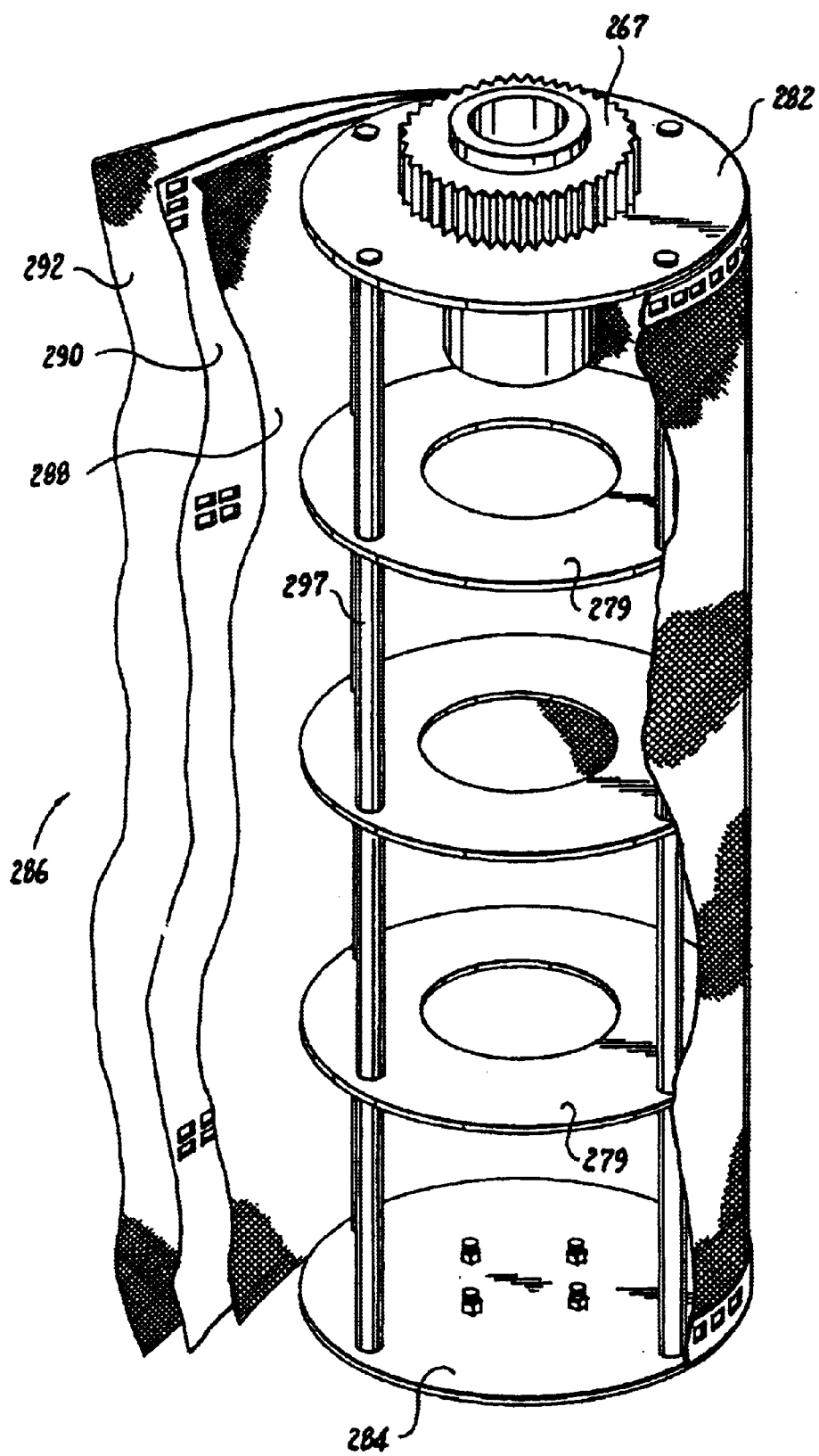
FIG. 9 is a partially exploded perspective view of a screen set used in the spin LYTIC filter assembly.

Sludged off particles falling out of solution fall through the low velocity liquid flow created by the relatively large containment tank 210 and are compressed into the frusto-conical second section 224 of the tank 210. This action is enhanced by the screen signals and the signals to the vibration units 621 coupled to the averaging tube 600. FIG. 8A shows the general flow paths of the influent stream entering the tank 210 and the action of the averaging tube 600 as well as the flow of the cleaned effluent within the interior boundaries of the screen set 286. FIG. 8A shows as well the sludge being formed due to the effects of the vibration unit 621 and also the general direction that the sludge falls within the tank 210. As will be appreciated, the cleaned effluent flows in a direction opposite the flow of the sludge and the unwanted waste particles remain on the outside of the screen set 286.

Once a predetermined amount of high density sludge is detected within the frusto-conical second section 224 using a sensor (e.g., pressure differential sensor disclosed hereinbefore), a signal is generated from the controller 500 or another controller or computer and this signal causes the pump 710 to run and at the same time, the inlet control valve 424 is controlled so that the influent stream is prevented from entering the tank 210, thereby creating a vacuum action resulting in the sludge being removed while drawing clean liquid from inside the screen set 286. The pump 710 is run only a few seconds in reference to the total sludge volume captured within the frusto-conical second section 224. With programming of the system controller 500, the sludge liquid content can be modified per discharge requirements.

The cleaned effluent that has passed through the screen set 286 and undergone the LYTIC cleaning process is then withdrawn through the shaft 252 by means of a controllable pump or the like. The shaft 252 thus serves as part of the effluent discharge system to receive cleaned effluent present within the confines of the screen set 286 and then discharge the cleaned effluent from the tank 210 to another location. Thus, system 100 is characterized by the influent (liquid with particles) being divided into a clean liquid stream and a liquid stream that is heavily laden with particles. The various features of the system 100 causes smaller particles to be collected and compacted into heavier masses that can fall out of solution with gravity. In other words, the system 100 separates heavier particles, than its liquid medium, in reference to a gravitational force.

The present system provides a system that overcomes the deficiencies of the prior art by providing a number of integrated cleaning techniques that promote better and more efficient cleaning of the influent stream. While this invention has been particularly shown and described with references to preferred embodiments thereof, it will be understood by those skilled in the art that various changes in form and details may be made therein without departing from the scope of the invention encompassed by the appended claims.

What is claimed is:

1. A spin filter apparatus for cleaning an influent stream, the apparatus comprising:

a housing having at least one inlet port for receiving the influent stream, at least one waste port for discharging waste and at least one output port for discharging a processed clean effluent stream;

a discharge conduit coupled to the at least one outlet port for discharging the processed clean effluent stream; and a spin filter assembly disposed within the housing and including a filter screen set formed of at least two screen filters that are rotatable about the discharge conduit and freely movable in a vertical direction along the discharge conduit, the screen set being coupled to a magnetic shaft that permits the screen set to be a free floating structure that is movable in the vertical direction due to a magnetic field generated between the magnetic shaft and a first magnetic element disposed in the housing that permits the screen set to be controllably and selectively moved in the vertical direction as the screen set rotates such that the influent stream is cleaned by passing through the screen set which results in creation of a first flow made up at least partially of the waste and which flows in one direction towards the at least one waste port and a second flow made up of the processed clean effluent stream that flows in another direction and is received within the discharge conduit where it is then withdrawn from the housing through the at least one outlet port.

2. The spin filter apparatus of claim 1, wherein the housing comprises a tank having a first cylindrically shaped section and a second frusto-conically shaped section, the at least one outlet port being associated with the first section and the at least one waste port being associated with the second section and wherein the at least one inlet port is formed in a side wall of the tank.

3. The spin filter apparatus of claim 1, wherein the discharge conduit comprises a tubular member formed of an insulating material.

4. The spin filter apparatus of claim 1, wherein the housing includes a top lid that seals one end of the housing and is coupled to the discharge conduit, the top lid having a first opening that is axially aligned with a bore formed through the discharge conduit so that the processed clean effluent can be discharged from the housing.

5. The spin filter apparatus of claim 4, wherein the top lid includes one or more sealed through holes for receiving signal carrier members therethrough.

6. The spin filter apparatus of claim 4, further including:

a collar securely attached to an inner surface of the tank lid and axially aligned with the first opening, the discharge conduit being securely attached to the collar such that the bore is axially aligned with the first opening.

7. The spin filter apparatus of claim 4, further including:

a LYTIC assembly including a first insulating spacer disposed around the discharge conduit proximate an inner surface of the top lid, a first conductive slip ring disposed adjacent the first insulating spacer, a second conductive slip ring spaced from the first conductive slip ring with a biasing element being disposed therebetween and applying a biasing force against the first and second conductive slip rings, the second conductive slip ring being electrically connected to one of the filter screens for delivering a LYTIC drive signal thereto, wherein each of the first and second conductive slip rings and the biasing element is disposed around the discharge conduit and is movable linearly thereal-ong.

8. The spin filter apparatus of claim 7, further including:

a second insulating spacer disposed between the second conductive slip ring and the screen set for insulating the screen set from direct contact with the second conductive slip ring.

9. The spin filter apparatus of claim 1, wherein the screen set comprises:

an inner screen;

an insulating spacer disposed around the inner screen; and an outer conductive screen disposed around the inner screen and electrically isolated therefrom by the insulating spacer, the outer conductive screen being constructed to block finer sized particles compared to the inner screen so that influent to be cleaned passes first through the outer screen as it flows to an interior space of the screen set where one open end of the discharge conduit is disposed.

10. The spin filter apparatus of claim 9, wherein the outer screen comprises a wire screen of mesh 200×600 and the inner screen is a stainless steel quarter inch perforation screen.

11. The spin filter apparatus of claim 9, wherein the insulating spacer has a thickness less than 50 microns but of sufficient thickness so that the outer and inner screens are electrically isolated from one another.

12. The spin filter apparatus of claim 9, wherein a height of the outer screen is less than the heights of the insulating screen and the inner screen such that upper and lower edges of the outer screen are indented relative to the insulating screen and the inner screen.

13. The spin filter apparatus of claim 7, further including:

a first screen disk; and a second screen disk with the screen set being disposed therebetween and fixedly attached thereto so that the first screen disk, the screen set, and the second screen disk rotates as a unit, the LYTIC assembly being disposed between the first screen disk and the top lid.

14. The spin filter apparatus of claim 13, wherein the screen set comprises:

an inner screen;

an insulating spacer disposed around the inner screen; and an outer conductive screen disposed around the inner screen and electrically isolated therefrom by the insulating spacer, the outer conductivity screen being constructed to block finer sized particles compared to the inner screen so that influent to be cleaned passes first through the outer screen as it flows to an interior space of the screen set where one open end of the discharge conduit is disposed, wherein the outer conductive screen is electrically connected to the LYTIC assembly such that an electric signal can be delivered thereto through the LYTIC assembly.

15. The spin filter apparatus of claim 14, wherein the outer conductive screen is connected to one end of a conductive member that is connected at its other end to the second conductive slip ring, the electric signal being an electric charge of a high frequency, high voltage, the inner screen acting as an earth ground reference that is insulated from the outer conductive screen so that an electric potential is created between the inner and outer screens.

16. The spin filter apparatus of claim 15, wherein the second conductive slip ring is spaced from and insulated from the first screen disk by a second insulating spacer that is disposed therebetween, the second insulating spacer being fixedly mounted to the first screen disk so that the two rotate are rotatable as a single unit.

17. The spin filter apparatus of claim 15, further including:
    top and bottom bearings for supporting the spin filter assembly while permitting free rotation of the screen set, the top bearing being mounted to the first screen disk and the bottom bearing being mounted to the second screen disk.

18. The spin filter apparatus of claim 17, wherein the discharge conduit is disposed at least partially within a bore formed through the top bearing and is in intimate contact therewith such that linear movement of the screen set along the discharge conduit is permitted, the linear movement of the screen set in a first direction toward the top lid causing the second insulating spacer to move linearly along the discharge conduit such that the biasing element stores additional energy and a distance between the first and second conductive slip rings decreases and linear movement of the screen set in an opposite second direction causes the biasing element to release energy and the second insulating spacer and second conductive slip ring to move away from the first conductive slip ring.

19. The spin filter apparatus of claim 17, wherein the bottom bearing is non-rotatably fixed to a support structure however the second screen disk is fixedly mounted to the bottom bearing in a manner in which the second screen disk is free to rotate relative to the bottom bearing.

20. The spin filter apparatus of claim 19, wherein the bottom bearing has a bore extending therethrough which receives the magnetic shaft in an intimate manner, while permitting the magnetic shaft to move linearly within the bore.

21. The spin filter apparatus of claim 1, wherein the magnetic shaft has a first permanent magnet disposed at a distal end thereof and the first magnetic element comprises a second permanent magnet spaced from the first permanent magnet, the first and second permanent magnets being oriented in equal polarity types such that the magnetic field is generated therebetween and the magnetic shaft magnetically floats the entire screen set on the magnetic field.

22. The spin filter apparatus of claim 21, further including:
    means for varying the strength of the magnetic field so as to linearly influence the position of the magnetic shaft, thereby permitting linear movement of the screen set at the same time that the screen set is rotating.

23. The spin filter apparatus of claim 22, wherein the means includes a device for sending signals to a modulating coil that is disposed around the second permanent magnet for altering the strength of the magnetic field.

24. The spin filter apparatus of claim 23, wherein the signals are applied current signals delivered to the modulating coil to cause either a total increase or decrease of the magnetic field that floats the screen set, whereby the change in magnetic field is translated into linear movement of the screen set about and along the discharge conduit.

25. The spin filter apparatus of claim 1, further including:
    means for altering a flow path of the entering influent stream such that a total input pressure associated with the stream is generally averaged, the means including a member that is disposed between the housing and the screen set.

26. The spin filter apparatus of claim 25, wherein the member is an open ended averaging tube that is fixedly mounted to an interior of the housing with the screen set being disposed within an interior of the averaging tube, the averaging tube having features formed on an outer surface thereof for collecting particles.

27. The spin filter apparatus of claim 26, wherein the features comprise a set of the V-shaped structures that protrude outwardly from the outer surface and are arranged so that they open upwardly toward an upper end of the tube and a second set of V-shaped structures that protrude outwardly from the outer surface and are arranged so that they open downwardly toward a lower end of the tube, the first set collecting particles that are denser than the liquid influent and the second set collecting particles that are less dense than the liquid influent.

28. The spin filter apparatus of claim 1, further including:
    means for subsonically and ultrasonically vibrating the influent stream to promote compacting of particles within the influent stream such that the particles are more easily collected.

29. The spin filter apparatus of claim 28, further including:
    means for subsonically and ultrasonically vibrating the influent stream to promote compacting of particles within the influent stream, the vibrating means being fixedly coupled to the averaging tube.

30. The spin filter apparatus of claim 1, further including:
    a central controller for controlling the rotation and the movement of the screen set in the vertical direction.

31. The spin filter apparatus of claim 1, further including:
    an electric motor operatively coupled to the screen set for causing selective rotation thereof.

32. The spin filter apparatus of claim 31, wherein the electric motor is disposed on an exterior face of a top lid of the housing and includes a rotatable shaft that is sealingly received through an opening formed in the top lid and a distal end of the shaft includes a first gear that meshes with a second gear that is associated with the spin filter assembly so that rotation of the shaft is translated into rotation of the screen set.

33. The spin filter apparatus of claim 32, wherein the electric motor is of a type where the shaft is rotatable in two directions.

34. The spin filter apparatus of claim 33, wherein the electric motor is communication with a controller that sends drive signals to the electric motor for selectively causing rotation of the screen set according to a signal waveform.

35. The spin filter apparatus of claim 34, wherein the signal waveform is of a type that the rotation is modulated to increase speed clockwise at a sine rate for one half time period and then decelerate for an equal time period which represents a first cycle that is repeated in succession before the shaft is rotated in the opposite direction with a polarity reversal of the same signal waveform.

36. The spin filter apparatus of claim 1, further including:
    an influent control system having at least one programmable valve for selectively starting and stopping the flow of the influent stream.

37. The spin filter apparatus of claim 1, further including:
an influent pre-chamber in fluid communication with the at least one inlet port and including at least one large mesh screen and strong magnets for blocking large pieces of waste in the influent stream and to capture ferrous materials.

38. A spin filter apparatus for cleaning an influent stream, the apparatus comprising:
a housing having at least one inlet port for receiving the influent stream, at least one waste port for discharging waste and at least one output port for discharging a processed clean effluent stream;
a discharge conduit coupled to the at least one outlet port for discharging the processed clean effluent stream; and
a spin filter assembly disposed within the housing and including a filter screen set formed of at least two screen filters that are freely rotatable about the discharge conduit;
magnetic means associated with the spin filter assembly for causing the screen set to be a free floating structure that is movable in a linear direction about the discharge conduit due to influence of a magnetic field while still being freely rotatable about the discharge conduit; and
wherein the rotation and linear movement of the spin filter assembly facilitates the influent stream in being cleaned by passing through the screen set which results in the formation of a first flow made up at least partially of the waste and which flows in one direction towards the at least one waste port and a second flow made up of the processed clean effluent stream that flows in another direction and is received within the discharge conduit where it is then withdrawn from the housing through the at least one outlet port.

39. The spin filter apparatus of claim 38, further including:
means for creating an electric potential between an outermost screen and an innermost screen of the screen set.

40. The spin filter apparatus of claim 39, wherein the means for creating the electric potential includes a first electrical pathway between a high voltage source and the outermost screen with the innermost screen serving as an earth ground reference.

41. The spin filter apparatus of claim 38, wherein the spin filter assembly includes rotatable first and second screen disks with the filter screen set being disposed between the first and second screen disks and fixedly mounted thereto, the screen set including an inner screen, an insulating spacer disposed around the inner screen and an outer conductive screen disposed around the inner screen and electrically isolated therefrom by the insulating spacer, the outer conductive screen being constructed to block finer sized particles compared to the inner screen so that influent to be cleaned passes first through the outer screen as it flows to an interior space of the screen set where one open end of the discharge conduit is disposed.

42. The spin filter apparatus of claim 38, wherein the spin filter assembly is coupled to a first linear bearing that intimately receives a portion of the discharge conduit in a sliding manner and a second linear bearing that receives a magnetic shaft that is part of the magnetic means and is intimately received within a bore of the second linear bearing in a sliding manner.

43. The spin filter apparatus of claim 42, wherein the magnetic means includes a first permanent magnet disposed at a distal end of the magnetic shaft that is received within the bore of the second linear bearing and a second permanent magnet that is disposed in a fixed position relative to the second linear bearing and proximate the bore of the second linear bearing so that the magnetic field is created between the first and second permanent magnets.

44. The spin filter apparatus of claim 43, wherein the first and second permanent magnets are oriented in equal polarity types such that the two repel one another causing the magnetic shaft to magnetically float the entire screen set on the magnetic field.

45. The spin filter apparatus of claim 43, further including:
means for varying the strength of the magnetic field so as to linearly influence the position of the magnetic shaft, thereby permitting linear movement of the screen set at the same time that the screen set is rotating.

46. The spin filter assembly of claim 45, wherein the means for varying the strength of the magnetic field includes a device for sending signals to a modulating coil that is disposed around the second permanent magnet for altering the strength of the magnetic field.

47. The spin filter assembly of claim 46, wherein the signals are applied current signals delivered to the modulating coil to cause either a total increase or decrease of the magnetic field that floats the screen set, whereby the change in the magnetic field is translated into linear movement of the screen set about and along the discharge conduit.

48. The spin filter assembly of claim 38, wherein the screen set is constructed so as to block particles of sizes greater than 30 micrometers.

49. The spin filter assembly of claim 38, wherein the screen set is constructed so as to block particles of sizes greater than 5 micrometers.

50. A method of filtering an influent stream by separating particles therefrom comprising the steps of:
introducing the influent stream into a spin filter assembly that includes a housing having at least one inlet port for receiving the influent stream and a discharge conduit coupled to at least one outlet port for discharging processed clean effluent stream, a filter screen set disposed in the housing and formed of at least two screen filters that are freely rotatable about the discharge conduit, and magnetic means associated with the spin filter assembly for causing the screen set to be a free floating structure that is movable in a linear direction about the discharge conduit due to influence of a magnetic field while still being freely rotatable about the discharge conduit;
rotating the screen set at a predetermined speed and predetermined direction;
selectively moving the screen set in a linear direction along the discharge conduit by forming and varying the strength of the magnetic field that floats the screen set as it rotates; and
withdrawing the processed clean effluent stream through the discharge conduit after it has passed through the screen set and waste particles have been separated therefrom.

51. The method of claim 50, further including the steps of:
applying a high frequency, high voltage signal to an outermost screen of the screen set;
connecting an innermost screen of the screen set to earth ground; and
electrically isolating the innermost and outermost screens so that an electric potential is created therebetween for providing an electric cleaning process, whereby particles that may become entangled with the screen set or disposed between the innermost and outermost screens are destroyed.

52. The method of claim 50, wherein the step of selectively moving the screen set in a linear direction comprises the steps of:

applying an electric current to at least one component of the magnetic means so as to cause a total increase or decrease of the magnetic field used to float the screen set resulting in linear movement of the screen set.

53. The method of claim 50, further including the step of:

modulating the water subsonically or ultrasonically to cause liquid acoustic cavitation at a surface of the screen set.

54. A spin filter apparatus for cleaning an influent stream, the apparatus comprising:

a housing having at least one inlet port for receiving the influent stream, at least one waste port for discharging waste and at least one output port for discharging a processed clean effluent stream;

a discharge conduit coupled to the at least one outlet port for discharging the processed clean effluent stream; and a spin filter assembly disposed within the housing and including a filter screen set formed of at least two screen filters that are freely rotatable about the discharge conduit;

magnetic means associated with the spin filter assembly for causing the screen set to be a free floating structure that is movable in a direction perpendicular to the direction of rotation and about the discharge conduit due to influence of a magnetic field while still being freely rotatable about the discharge conduit; and wherein the rotation and perpendicular movement of the spin filter assembly provides two different cleaning operations resulting in the influent stream being cleaned by passing through the screen set to form a first flow made up at least partially of the waste and which flows in one direction towards the at least one waste port and a second flow made up of the processed clean effluent stream that flows in another direction and is received within the discharge conduit where it is then withdrawn from the housing through the at least one outlet port.

* * * * *